(12) United States Patent
Ichikawa et al.

(10) Patent No.: US 9,290,287 B2
(45) Date of Patent: Mar. 22, 2016

(54) FOAMED AND STRETCHED PLASTIC CONTAINERS AND METHOD OF PRODUCING THE SAME

(71) Applicant: TOYO SEIKAN GROUP HOLDINGS, LTD., Tokyo (JP)

(72) Inventors: Kentarou Ichikawa, Kanagawa (JP); Nobuhisa Koiso, Kanagawa (JP); Norio Akuzawa, Kanagawa (JP); Hiroki Iino, Kanagawa (JP); Tetsuro Nomura, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 14/347,799

(22) PCT Filed: Sep. 18, 2012

(86) PCT No.: PCT/JP2012/073788
§ 371 (c)(1),
(2) Date: Mar. 27, 2014

(87) PCT Pub. No.: WO2013/047262
PCT Pub. Date: Apr. 4, 2013

(65) Prior Publication Data
US 2014/0231426 A1    Aug. 21, 2014

(30) Foreign Application Priority Data

Sep. 30, 2011  (JP) ................. 2011-217680
Oct. 7, 2011   (JP) ................. 2011-223353
Oct. 31, 2011  (JP) ................. 2011-239630

(51) Int. Cl.
*B65D 1/40* (2006.01)
*B65D 1/02* (2006.01)
(Continued)

(52) U.S. Cl.
CPC . *B65D 1/40* (2013.01); *B29B 11/08* (2013.01); *B65D 1/0207* (2013.01);
(Continued)

(58) Field of Classification Search
CPC ........... B65D 81/3837; B65D 81/3846; B65D 81/3839; B65D 1/40; B65D 1/0215; B65D 1/0207; B65D 1/02; B32B 5/18; B29B 11/08; B29B 11/06; B29C 44/027; B29C 44/0407; B29C 44/08; B29C 44/352; B29C 49/06
USPC ........ 220/62.15, 62.12, 62.11, 675; 215/13.1, 215/12.1; 428/36.5; 264/51
See application file for complete search history.

(56) References Cited

U.S. PATENT DOCUMENTS 8,714,401 B2    5/2014  Ichikawa et al.
2009/0026198 A1  1/2009  Ichikawa et al.
(Continued)

FOREIGN PATENT DOCUMENTS

EP  1902960 A1 *  3/2008  ............... B65D 1/00
JP  54-013567        2/1979
(Continued)

OTHER PUBLICATIONS

U.S. Appl. No. 14/142,270 to Kentarou Ichikawa et al., which was filed on Dec. 27, 2013.
International Search Report Issued Dec. 25, 2012 in PCT/JP2012/073788.
Japanese Office issued in application No. 2011-239630, mail date is Jul. 7, 2015.
Japanese Office issued in application No. 2011-217680, mail date is Jul. 7, 2015.

*Primary Examiner* — Robert J Hicks
(74) *Attorney, Agent, or Firm* — Greenblum & Bernstein, P.L.C.

(57) ABSTRACT

A foamed and stretched plastic container having a basic structure which includes a mouth portion and a body wall continuous to the mouth portion and is stretch-formed, the body wall forming a foamed region where foamed cells are distributed, and the mouth portion being an unfoamed region where no foamed cell is present, wherein the foamed cells present in the foamed region have a flat shape being stretched in the direction of stretch, and the foamed cells positioned in the central portion in the direction of thickness of the container wall have the largest lengths in the direction of maximum stretch.

20 Claims, 15 Drawing Sheets

(51) Int. Cl.
   *B65D 8/02*   (2006.01)
   *B29B 11/08*   (2006.01)
   *B29K 105/00*   (2006.01)
   *B29K 105/04*   (2006.01)
   *B29C 49/06*   (2006.01)
   *B29L 31/00*   (2006.01)
   *B29K 67/00*   (2006.01)
   *B29C 44/02*   (2006.01)
   *B29C 44/04*   (2006.01)
   *B29C 44/08*   (2006.01)
   *B29C 44/34*   (2006.01)

(52) U.S. Cl.
   CPC   *B29B 2911/1402* (2013.01); *B29B 2911/1404* (2013.01); *B29B 2911/14013* (2013.01); *B29B 2911/14026* (2013.01); *B29B 2911/14033* (2013.01); *B29C 44/027* (2013.01); *B29C 44/0407* (2013.01); *B29C 44/08* (2013.01); *B29C 44/352* (2013.01); *B29C 49/06* (2013.01); *B29K 2067/003* (2013.01); *B29K 2105/041* (2013.01); *B29K 2105/046* (2013.01); *B29K 2105/258* (2013.01); *B29L 2031/712* (2013.01)

(56) References Cited

U.S. PATENT DOCUMENTS

2010/0326994 A1\* 12/2010 Ichikawa ............... B29B 11/08
                                                                    220/675
2014/0110415 A1    4/2014 Ichikawa et al.

FOREIGN PATENT DOCUMENTS

| JP | 62-18335 | 4/1987 |
| JP | 2001-150521 A | 6/2001 |
| JP | 2005-246822 A | 9/2005 |
| JP | 2006-321887 | 11/2006 |
| JP | 2007-22554 A | 2/2007 |
| JP | 2008-094495 | 4/2008 |
| JP | 2009-234627 | 10/2009 |
| JP | 2009-262366 | 11/2009 |
| JP | 2009-262550 | 11/2009 |
| JP | 2010-241475 A | 10/2010 |

\* cited by examiner

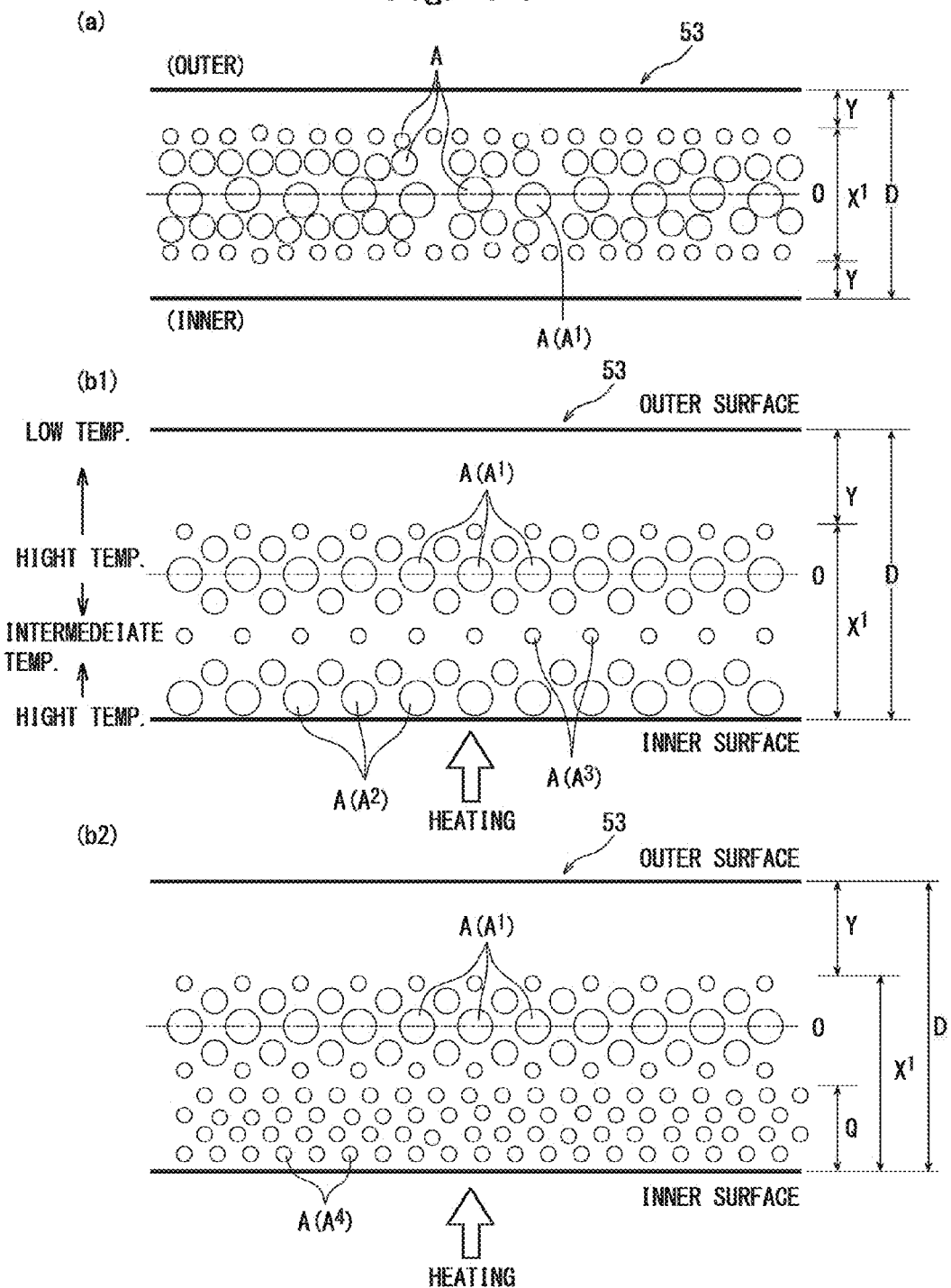

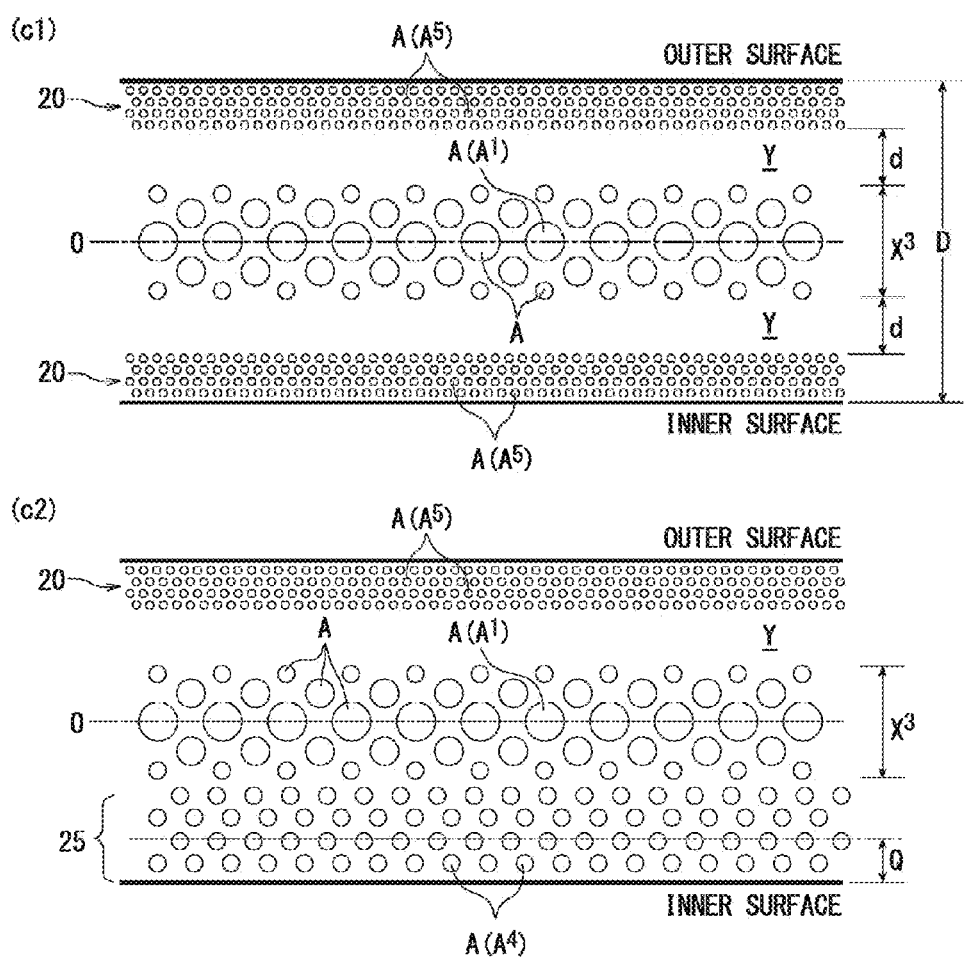

A) Example 1    B) Example 2    C) Comp. Ex. 1

Example 1

Example 2

(LEFT) Fig. 13-a: Example 4
(RIGHT) Fig. 13-b: Example 6

Fig. 15
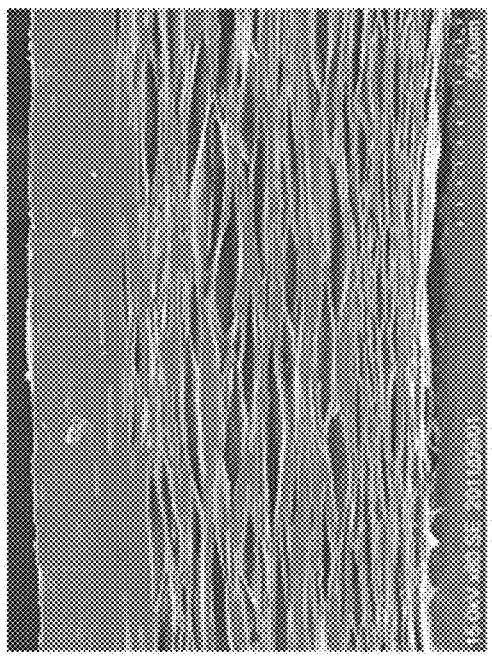
Fig. 15-b: Example 4
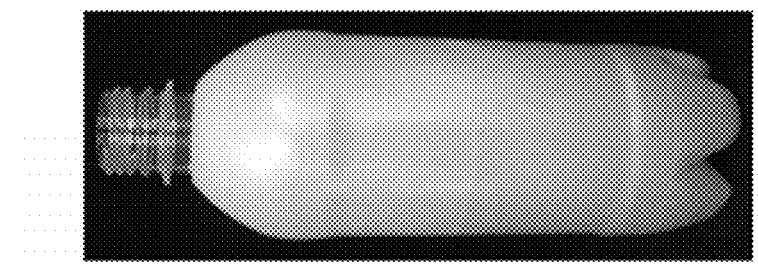
Fig. 15-a: Example 4

(Example 7: BOTTLE IN CROSS SECTION)

Fig. 17
(Example 7: PREFORM IN CROSS SECTION)
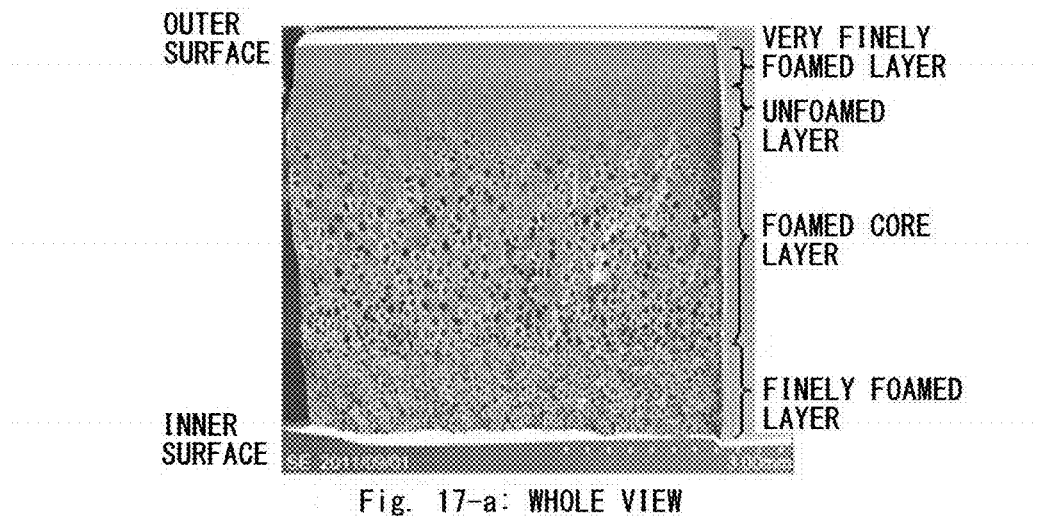
Fig. 17-a: WHOLE VIEW
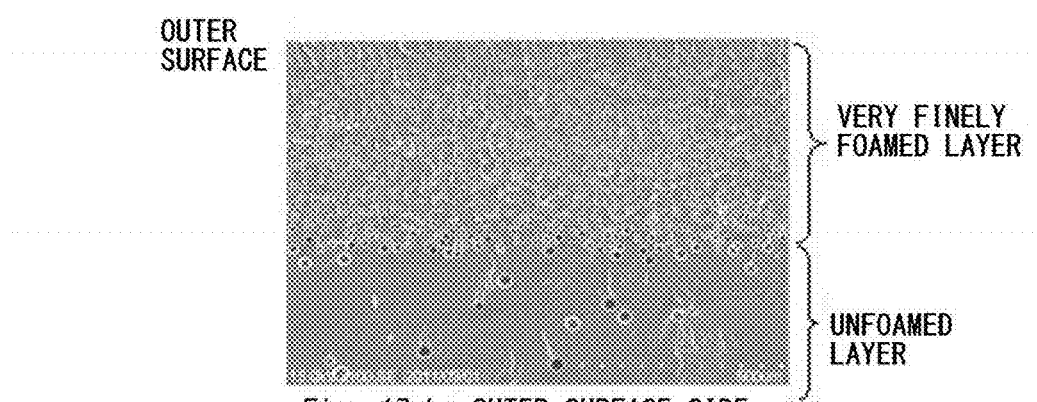
Fig. 17-b: OUTER SURFACE SIDE ON AN ENLARGED SCALE (Example 18: PREFORM IN CROSS SECTION)

FOAMED AND STRETCHED PLASTIC CONTAINERS AND METHOD OF PRODUCING THE SAME

TECHNICAL FIELD

This invention relates to foamed and stretched plastic containers produced by stretch-forming performs that are obtained by injection-molding a molten polymer in which an inert gas is dissolved. More specifically, the invention relates to foamed and stretched plastic containers produced by a hot-parison method which stretch-forms preforms obtained by the injection-molding while maintaining them at a stretchable temperature and to a method of producing the same.

BACKGROUND ART

Owing to their excellent properties such as transparency, heat resistance, gas-barrier property, etc., the stretch-formed plastic containers obtained by using a polyester as represented polyethylene terephthalate (PET) and the like have now been widely used for a variety of applications.

In recent years, further, it has been strongly urged to reutilize the resources, and the foamed and stretched containers have been known as the stretch-formed containers to favorably meet such a demand. Namely, the foamed and stretched containers are capable of expressing light-blocking capability due to foaming without being blended with a coloring agent, and is very adapted to being recycled as compared to the containers which are imparted with the light-blocking capability by being blended with the coloring agent.

As means for foaming plastic formed bodies, the chemical foaming has long been known using a chemical foaming agent such as sodium carbonate. At present, however, attention has been given to the foaming based on the microcellular technology according to which an inert gas is dissolved in a plastic material and is grown into bubbles without using the chemical foaming agent. This foaming technology is also called physical foaming and offers such advantages as forming the bubbles (foamed cells) in sizes considerably smaller than those of the chemical foaming and enabling the bubbles to be homogeneously distributed.

The foamed and stretched plastic containers that utilize the foaming based on the microcellular technology have been proposed, for example, by the present applicant (patent documents 1 to 4).

As the methods of producing stretched plastic containers, there have been known the cold-parison method and the hot-parison method.

The cold-parison method is a method of producing containers by forming container preforms by injection-molding a plastic material, once cooling the preforms, and stretch-forming the preforms by transferring them to the step of stretch-forming such as blow-molding. In this method, the step of forming the preforms by the injection-molding is completely separate and independent from the step of forming the preforms into the containers by the stretch-forming, offering a great advantage from the standpoint of high-speed production and mass production, such as making it possible to set optimum conditions in each of the forming steps and to operate the forming steps at their maximum rates. This method, further, offers such advantages that the preforms can be stored, that the site where the containers which are the final products are to be produced can be determined depending upon the requirements of the users without being restricted to the site where the preforms are produced. Therefore, the PET bottles for containing, especially, beverages have almost all been produced by the cold-parison method.

On the other hand, the hot-parison method is a method of producing containers by stretch-forming the container preforms formed by injection-molding the plastic material without cooling the preforms, and transferring them to the step of stretch-forming while maintaining them at a stretchable temperature. In this method, the preform that is formed is readily stretch-formed without interruption making it possible to utilize, in the step of stretch-forming, the heat possessed by the preform readily after it is formed offering a great advantage from the standpoint that the heat energy is effectively utilized and that the facility cost is not expensive. Therefore, this method is advantageous for the production of thick containers to which the cold-parison method could not be applied since it was difficult to heat the preforms. In this method, however, the stretch-forming is conducted right after having formed the preforms and, therefore, the stretch-forming conditions are dependent upon the conditions for forming the preforms (e.g., dependent upon the forming rate). The mass productivity and the rate of production are inferior to those of the cold-parison method and, therefore, the hot-parison method is applied to producing products in many kinds but in small lots (e.g., containers for containing seasonings and detergents).

It is very difficult to apply the hot-parison method to the production of foamed and stretched plastic containers by utilizing the microcellular technology.

Namely, with the cold-parison method, the preform that is formed is once cooled and is, thereafter, stretch-formed. It is, therefore, allowed to provide the step of foaming by heating between the step of forming the preform and the step of stretch-forming, and to control the degree of foaming by adjusting the heating condition. With the hot-parison method, on the other hand, the stretch-forming is conducted following the formation of the preform without interruption. Therefore, it is not allowed to provide any independent step of foaming between the step of forming the preform and the step of stretch-forming, and it is very difficult to control the foaming.

In producing foamed containers, for instance, it is required to suppress the foaming in the mouth portion of the containers to which a cap is to be fixed by fitting or screw-engagement. This is because a change in the size due to foaming, an increase in the surface roughness and a decrease in the strength, bring about a decrease in the sealing by the cap and, further, make it difficult to attain the engagement between the cap and the mouth portion of the containers.

In fact, a patent document 5 proposes a foamed and stretched plastic container obtained by the hot-parison method without, however, teaching anything about suppressing the foaming in the mouth portion of the containers. Therefore, the foamed container is very poorly practicable.

PRIOR ART DOCUMENTS

Patent Documents

Patent document 1: JP-A-2006-321887
Patent document 2: JP-A-2008-94495
Patent document 3: JP-A-2009-234627
Patent document 4: JP-A-2009-262550
Patent document 5: JP-B-62-18335

OUTLINE OF THE INVENTION

Problems that the Invention is to Solve

The present invention is to provide foamed and stretch-formed plastic containers having a peculiar structure obtained by the hot-parison method and a method of producing the containers.

Means for Solving the Problems

The present inventors have conducted the experiments and study extensively about the method of producing foamed and stretch-formed plastic containers by utilizing the hot-parison method. As a result, the inventors have discovered that the foamed and stretched plastic container having a foamed structure (structure in which foamed cells are distributed) specific to the hot-parison method can be obtained if the cavity of a metal mold is injection-filled with the molten polymer dissolving gas while applying a pressure so as to suppress the foaming therein at the moment of injection-molding the preform and, after the pressure is released, if the foaming is permitted to take place by utilizing the temperature of the resin itself that is forming the preform, and have thus completed the invention.

According to the present invention, there is provided a foamed and stretched plastic container having a mouth portion and a body wall continuous to the mouth portion and is stretch-formed, the body wall forming a foamed region where foamed cells are distributed, and the mouth portion being an unfoamed region where no foamed cell is present, wherein;

the foamed cells present in the foamed region have a flat shape being stretched in the direction of stretch, and the foamed cells positioned in the central portion in the direction of thickness of the container wall have the largest lengths in the direction of maximum stretch.

The foamed and stretched plastic containers of the invention are obtained by the hot-parison method, and can be roughly divided into those of the three types, i.e., normally distributed type, locally distributed type and very finely foamed type depending on the mode of distribution of foamed cells present in the foamed region formed in the body wall.

In the foamed and stretched plastic container of the normally distributed type, the foamed cells are concentrated in the core layer in the central portion of the container wall, and an unfoamed layer where no foamed cell is distributed is formed on the outer surface side and/or on the inner surface side of the core layer.

In the container of the normally distributed type, it is desired that:
(1) The lengths of the foamed cells in the direction of maximum stretch positioned on the innermost surface side and on the outermost surface side relative to the central portion in the direction of thickness of the container wall, are smaller than the lengths of the foamed cells in the direction of maximum stretch positioned in the central portion;
(2) In the foamed region, the unfoamed layers are formed on the inner surface side and on the outer surface side relative to the central portion in the direction of thickness of the container wall, the unfoamed layer on the outer surface side being thicker than the unfoamed layer on the inner surface side; and
(3) In the foamed region, the thickness of the container wall is not less than 0.3 mm, and the total thickness of the unfoamed layers on the inner surface side and on the outer surface side is in a range of 20 to 70% of the thickness of the container wall.

In the foamed and stretched plastic container of the locally distributed type, further, the foamed cells are locally distributed on the inner surface side relative to the central portion in the direction of thickness of the container wall.

In the container of the locally distributed type, it is desired that:
(1) In the foamed region, the foamed cells are distributed from the central portion of the container wall up to the surface layer portion in the inner surface of the container wall, and the foamed cells which are the shortest in the direction of maximum stretch are distributed in the form of a layer in the intermediate portion between the central portion of the container wall and the surface layer portion in the inner surface of the container wall;
(2) In the foamed region, the foamed cells are distributed from the central portion of the container wall up to the surface layer portion in the inner surface of the container wall, and the foamed cells which are the shortest in the direction of maximum stretch are distributed at the highest density in the form of a layer in the surface layer portion in the inner surface of the container wall;
(3) In the foamed region, the thickness of the container wall is not less than 0.3 mm, and an unfoamed layer where no foamed cell is present is formed on the outer surface side of the container wall over a range of 10 to 35% of the thickness of the container wall; and
(4) The foamed region has a visible ray transmission factor of not more than 20%.

Further, the foamed and stretched plastic container of the very finely foamed type has a structure in which in the foamed region, a very finely foamed layer is formed in the surface layer portion on the outer surface side of the container wall and/or in the surface layer portion on the inner surface side thereof, the very finely foamed layer containing, distributed therein, the foamed cells which are the shortest in the direction of maximum stretch, and an unfoamed layer where no foamed cell is distributed is formed between the very finely foamed layer and the foamed core layer that contains the foamed cells positioned in the central portion of the container wall.

In the container of the very finely foamed type, the above-mentioned very finely foamed layer is formed specifically in the surface layer portion on the outer surface side of the container wall.

According to the present invention, further, there is provided a method of producing a foamed and stretched plastic container by forming a preform of a shape having a mouth portion and a forming portion continuous to the mouth portion by injection-molding a mold cavity with a molten polymer, transferring the preform taken out from the mold cavity to the step of stretch-forming, and stretch-forming the forming portion of the preform, wherein;

the molten polymer is a melt in which an inert gas is dissolved;

the metal mold forming the mold cavity is a metal mold of which a portion corresponding to the mouth portion has a cooling capability larger than that of a portion corresponding to the forming portion;

the mold cavity is injection-filled with the molten polymer while applying a pressure thereto to hold a high pressure in the mold cavity so that the foaming does not take place;

the mouth portion is forcibly cooled by the metal mold so that the foaming does not take place even after the pressure is released;

the forming portion is weakly cooled by the metal mold so that the foaming takes place starting from the central portion of the container wall due to the temperature of the resin after the pressure has been released; and the preform taken out from the metal mold is transferred to the step of stretching and is stretch-formed while the central portion of the container wall of the forming portion is still being maintained at a stretch-formable temperature.

The method of production of the present invention can employ the following means (1) to (5).

(1) When the preform is taken out from the mold cavity after the pressure has been released, the central portion of the container wall of the forming portion is maintained at a foamable and stretchable temperature, and the foaming takes place starting from the central portion of the forming portion as the preform is taken out from the mold cavity;

(2) When the preform is taken out from the mold cavity after the pressure has been released, the outer surface and the inner surface of the forming portion of the preform have been cooled down to a temperature at which the forming does not take place, and after the preform is taken out from the mold cavity, the foaming proceeds from the central portion toward the outer surface side and the inner surface side due to heat conducted from the central portion;

(3) At least after the preform is taken out from the mold cavity, the temperatures on the outer surface and the inner surface of the forming portion of the preform rise to the stretchable temperature due to heat conducted from the central portion;

(4) Even after the preform is taken out from the mold cavity, the outer surface and the inner surface of the forming portion of the preform are maintained at temperatures at which no foaming takes place; and (5) The forming portion taken out from the metal mold is selectively heated from the inner surface side so that the foaming starts taking place from the central portion of the container wall as well as from the inner surface side of the forming portion.

Namely, according to the production method of the present invention, the forming portion of the preform forms the foamed region where the foamed cells are distributed and in the foamed region, the foaming takes place starting from the central portion of the container wall. Further, the foamed cells formed in the forming portion of the preform are not of a flat shape since they have not been stretched and assume a spherical shape or a shape close to the spherical shape.

Moreover, upon adjusting the distribution of the foamed cells in the foamed region in the forming portion of the foamed preform introduced into the step of stretching, it is made possible to produce a foamed and stretched plastic container of the above-mentioned normally distributed type, the locally distributed type or the very finely foamed type.

When, for example, the foamed and stretched plastic container of the normally distributed type is to be produced, (a) the foaming in the forming portion of the preform is so adjusted that in the foamed preform introduced into the step of stretching, the foamed cells positioned on the innermost surface side and on the outermost surface side in the direction of thickness of the container wall have diameters smaller than the diameters of the foamed cells positioned in the central portion.

Further, when the foamed and stretched plastic container of the locally distributed type is to be produced, (b) the foaming in the forming portion of the preform is so adjusted that in the foamed preform introduced into the step of stretching, the foamed cells are locally distributed between the central portion and the inner surface side in the direction of thickness of the container wall.

Further, when the foamed and stretched plastic container of the very finely foamed type is to be produced, (c) the foaming in the forming portion of the preform is so adjusted that in the foamed preform introduced into the step of stretching, the surface layer on the outer surface side and/or the inner surface side of the container wall of the forming portion is forming a very finely foamed layer in which very finely foamed cells having diameters of not more than 15 μm are distributed in the form of a layer at a density of not less than $1 \times 10^7$ cells/cm$^3$.

Effects of the Invention

In the foamed and stretched plastic container (hereinafter simply referred to as "foamed and stretched container") of the present invention, the body wall (its end is forming a closed bottom portion) is formed from the forming portion of a foamed preform and is creating a foamed region containing foamed cells which are distributed in a manner specific to the hot-parison method. Concretely speaking, in the foamed region where the foamed cells are distributed, the cell distribution is such that the foamed cells positioned in the central portion of the container wall have the largest lengths, and the foamed cells positioned on the inner side and the outer side have lengths shorter than the foamed cells positioned in the central portion.

The foamed and stretched containers of the invention having the foamed structure can be divided into those of the normally distributed type, those of the locally distributed type and those of the very finely foamed type depending on the mode of distribution of the foamed cells.

Among them, the foamed and stretched containers of the normally distributed type exhibit light-blocking capability higher than a certain degree without impairing gas-barrier property or surface smoothness.

The foamed and stretched containers of the locally distributed type exhibit light-blocking capability higher than that of the normally distributed type and can lower the visible ray transmission factor down to be, for example, 20% or less.

Further, the foamed and stretched containers of the very finely foamed type exhibit higher light-blocking capability than that of the locally distributed type and can lower the visible ray transmission factor down to be, for example, 10% or less.

The foamed and stretched containers of the present invention are obtained by the hot-parison method, have a cell distribution specific to the hot-parison method, and have a distinguished feature in that the container mouth portion formed from a molten polymer in which a gas dissolved is creating an unfoamed region where no foamed cell is present. Namely, the container mouth portion where no foamed cell is present makes it possible to effectively avoid a decrease in the properties such as engagement with the cap and sealing by the cap, caused by a dimensional change stemming from the foaming, by a decrease in the strength and by an increase in the surface roughness. Therefore, the container mouth portion of the invention makes it possible to maintain practicability. It is, therefore, allowed to avoid foaming in the container mouth portion and to maintain practicability; i.e., the present invention plays a very great role toward practicably utilizing the foaming by the hot-parison method.

According to the invention, further, the foamed preform introduced into the step of stretch-forming is adjusted for its progress of foaming taking place from the outer side and the inner side of the forming portion, enabling the foamed cells of a flat shape present in the body wall (foamed region) of the stretch-foamed container to assume any one of the normally distributed type, locally distributed type or finely foamed type. Depending on the mode of distribution, the containers can be imparted with excellent light-blocking capability, surface smoothness and appearance.

BRIEF DESCRIPTION OF THE DRAWINGS

FIG. 4 is a view showing the states of distribution of foamed cells in the foamed region (forming portion) of the foamed preform introduced into the step of stretching.

FIG. 15 includes a photograph showing the appearance of a foamed container (bottle) prepared in Example 4 and a microphotograph showing, in cross section, the body wall of the same container.

FIG. 17 includes a microphotograph showing, in cross section, the forming portion of the preform prepared in Example 7 and a microphotograph showing, in cross section and on an enlarged scale, the outer side of the forming portion.

MODES OF THE INVENTION

<Production of the Foamed and Stretched Containers>

Figure 1:
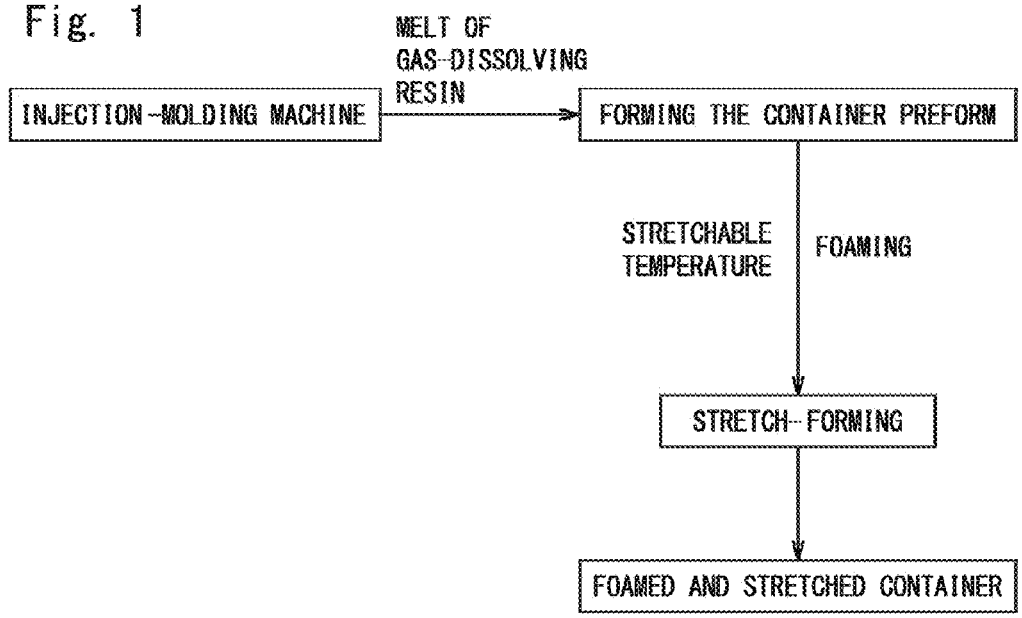
FIG. 1 is a diagram illustrating the whole process of a method of producing foamed and stretched containers of the present invention.

The foamed and stretched container of the present invention is formed by a hot-parison method by using a molten polymer in which an inert gas is dissolved, the hot-parison method comprising, as shown in FIG. 1, a step of forming a preform for a container by the injection-molding, a step of foaming while maintaining the forming portion of the formed container preform at a stretchable temperature (a foamed container preform is obtained in this step), and a step of stretch-forming the forming portion of the obtained foamed preform while maintaining it at the stretchable temperature.

<Starting Resins>

As the starting resins used for producing the containers of the invention, there can be used known thermoplastic resins without any special limitation so far as inert gas can be dissolved in them inert gas. For example, there can be used olefin resins such as low-density polyethylene, high-density polyethylene, polypropylene, poly 1-butene, poly 4-methyl-1-pentene, random or block copolymers between α-olefins such as ethylene, propylene, 1-butene or 4-methyl-1-pentene, and cyclic olefin copolymers; ethylene-vinyl copolymers such as ethylene-vinyl acetate copolymer, ethylene-vinyl alcohol copolymer, and ethylene-vinyl chloride copolymer; styrene resins such as polystyrene, acrylonitrile-styrene copolymer, ABS, and α-methylstyrene-styrene copolymer; vinyl resins such as polyvinyl chloride, polyvinylidene chloride, vinyl chloride-vinylidene chloride copolymer, methyl polyacrylate and methyl polymethacrylate; polyamide resins such as nylon 6, nylon 6-6, nylon 6-10, nylon 11, and nylon 12; polyester resins such as polyethylene terephthalate, polybutylene terephthalate, polyethylene naphthalate and copolymerized polyesters thereof; polycarbonate resin; polyphenylene oxide resin; and biodegradable resin such as polylactic acid; in one kind or in a blend of two or more kinds. When the forming body is to be used for forming a container, in particular, it is desired to use the olefin resin and the polyester resin. Among them, the polyester resin and, specifically, the polyethylene terephthalate resin (PET) is best suited as the resin for containers and can most desirably be used for producing the foamed and stretched container of the present invention.

It is, as a matter of course, allowable, if recyclable property is neglected, to add coloring agents as well as additives for imparting functional properties such as barrier property.

<Dissolution of Inert Gas>

The inert gas dissolved in the molten polymer serves as a foaming agent. Usually, a nitrogen gas or a carbon dioxide is used.

The inert gas is dissolved in the molten polymer by dosing the inert gas, under the application of a predetermined pressure, into the resin maintained in a heated and melted state in a resin-mixing portion (or in the plasticizing portion) of an injection-molding machine that is used in the step of forming the preform that is described below. According to this method, the gas can be dissolved in the injection-molding machine; i.e., the inert gas can be efficiently dissolved in the step of forming the container preform.

Here, by adjusting the amount of the gas to be dissolved, it is allowed to adjust the number of the foamed cells formed by heating. For example, if the gaseous pressure is elevated and the mixing time is lengthened under the gas pressure, then the amount of dissolution of gas can be increased and the number of the foamed cells can be increased making it, however, difficult to control the foaming. Namely, inconvenience is caused by foaming, such as foaming takes place at the time of forming the container preform and the container that is finally obtained loses surface smoothness. Therefore, the inert gas should be dissolved in an amount in a suitable range.

<Forming the Preform>

Figure 2:
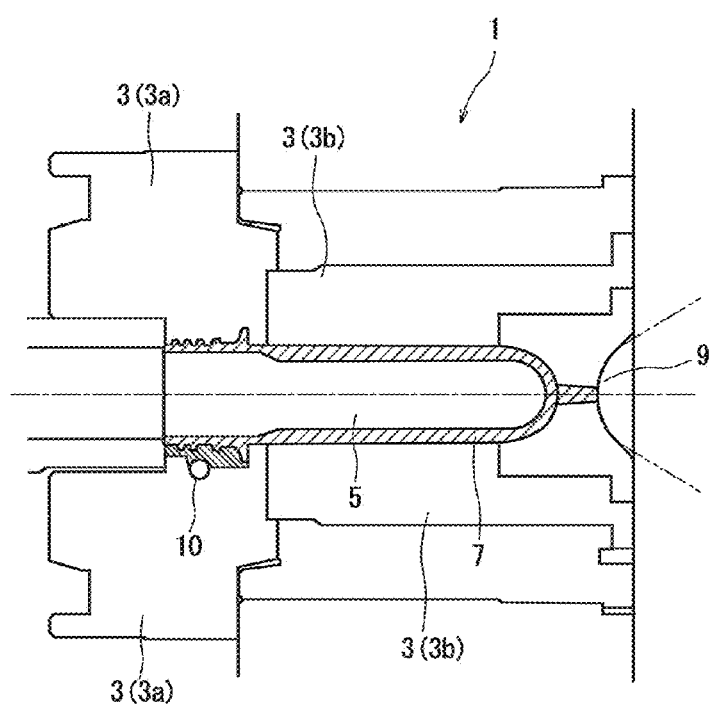
FIG. 2 is a view illustrating an injection process employed for forming a preform that is used in the method of production of the present invention.

In the invention, the molten polymer in which the gas is dissolved with the gas as described above is injected into the metal mold in which a high pressure is held and is injection-filled. With reference to FIG. 2 which illustrates the process of injection, an injection metal mold generally designated at 1 has a shell metal mold 3 that is maintained cool and a core metal mold 5. A cavity 7 is formed by the metal molds 3 and 5. The cavity 7 is filled with the molten polymer injected from an injection nozzle 9 connected to an injection-molding machine (not shown). Further, the cavity 7 is communicated with a gas port 10.

That is, the molten polymer in which the gas is dissolved is injected into the cavity 7 from the injection nozzle 9. Upon being cooled and solidified in the cavity 7, the molten polymer assumes the shape of the cavity 7.

Figure 3:
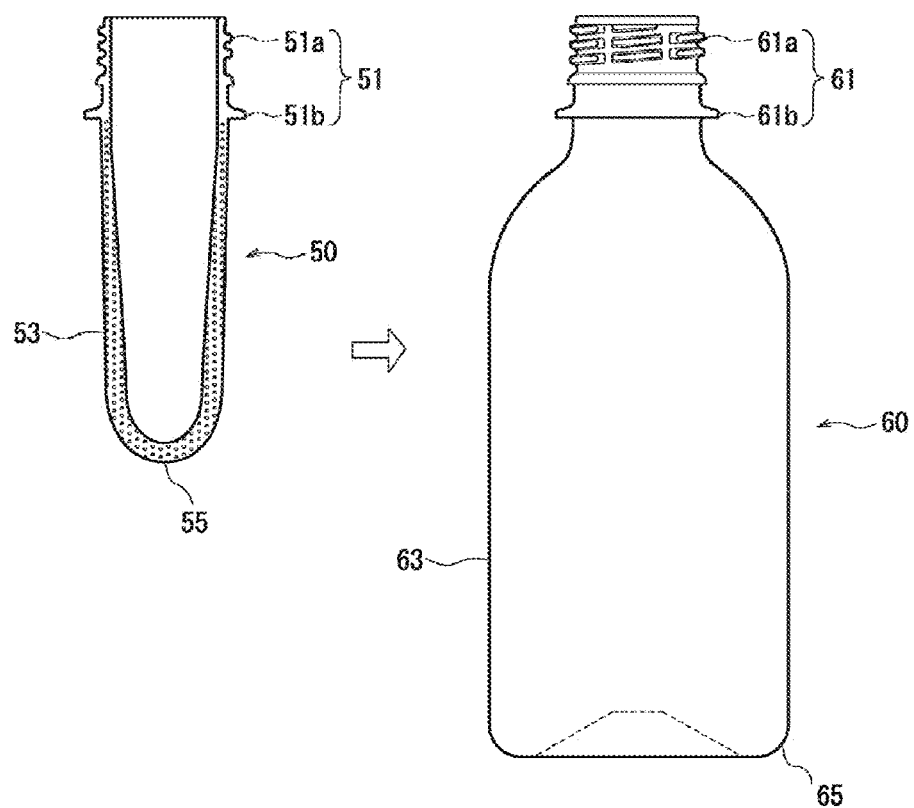
FIG. 3 is a view showing, in cross section, a foamed preform introduced into the step of stretching, and the whole shape of a foamed and stretched container obtained from the preform.

Referring to FIG. 3, for example, a container preform 50 formed by the injection-molding includes a mouth portion 51 and a forming portion 53. The forming portion 53 is a portion that is to be stretch-formed by blow-molding that is described below, corresponds to the body wall of the container that is to be formed, and has a closed bottom portion 55 at an end thereof.

The mouth portion 51 is a portion that is not stretched, and is forming a threaded portion 51a that comes into screw-engagement with a cap and a support ring 51b for being carried (depending on the type of the container that is formed, however, the support ring 51b is not often formed). Therefore, a container 60 obtained by blow-molding the preform 50 includes a mouth portion 61 that corresponds to the mouth portion of the preform 50 and a body wall 63 that corresponds to the forming portion 53 of the preform, the end of the body wall 63 being closed to form a bottom portion 65. Like the mouth portion 51 of the preform 50, the mouth portion 61 has a threaded portion 51a and a support ring 51b.

As will be understood from the above shape, foaming must be avoided in the mouth portion 51 (mouth portion 61 of the container 60) of the preform 50 (and container 60). This is because defective engagement with the cap and a decrease in the sealing are brought about by a decrease in the strength, by a decrease in the dimensional stability and by a increase in the surface roughness due to foaming. To avoid defective engagement with the cap and decrease in the sealing, it is specifically essential to avoid foaming in the threaded portion 51a (61a of the container 61).

Reverting to FIG. 2, to form the above preform 50, the shell metal mold 3 for forming the cavity 7 is divided into a mouth portion metal mold 3a that corresponds to the mouth portion 51 and a forming portion metal mold 3b that corresponds to the forming portion 53.

Here, to produce the container 60 by the hot-parison method according to the present invention, the forming portion 53 (specifically, the central portion in the wall of the forming portion 53) of the preform 50 held in the cavity 7 must be maintained at a temperature at which it can be stretched and foamed, and must, at the same time, be maintained, at the mouth portion 51 of the preform 50, at a temperature at which the foaming does not take place. A portion that corresponds to the mouth portion 51 must be maintained at a temperature lower than the portion that corresponds to the forming portion 53. Therefore, the cooling capability of the mouth portion metal mold 3a corresponding to the mouth portion 51 must be set to be larger than the cooling capability of the forming portion metal mold 3b corresponding to the forming portion 52. For example, though not shown, the temperature of the cooling medium introduced into the cooling pipes passing through the mouth portion metal mold 3a is set to be lower than the temperature of the cooling medium that flows into the cooling pipes in the forming portion metal mold 3b. The flow rate of the cooling water and the shape of the cooling holes are also set by taking the cooling effect into account as a matter of course.

Here, if the portion corresponding to the mouth portion 51 can be strongly cooled and if the portion (3b) corresponding to the forming portion 53 can be weakly cooled, then the shell metal mold 3 does not have to be of the split type.

If the forming portion 53 is capable of maintaining the central portion of the wall at a temperature at which it can be stretch-formed, then the temperatures of the outer surface portion and of the inner surface portion may be cooled down to a temperature region lower than the stretch-formable temperature until when the preform is introduced into the step of stretch-forming that will be described later so far as the temperature can be elevated up to the stretch-formable temperature by the heat conducted from the central portion.

In injecting the molten polymer according to the invention, further, a nitrogen gas, carbon dioxide or air is fed into the cavity 7 from the gas port 10 to hold the pressure high in the cavity 7. With the molten polymer in which the gas is dissolved being filled in the cavity 7 in which a high pressure is held, it is allowed to effectively suppress the breakage of foams of when the molten polymer is fluidized in the cavity 7, to prevent the occurrence of swirl marks caused by the breakage of foams and, therefore, to obtain a formed article having a highly smooth surface.

For example, if the molten polymer in which the gas is dissolved is filled in the cavity 7, the gas dissolved in the end portion of the molten polymer flowing into the cavity 7 expands due to a pressure differential relative to space in the cavity 7, and brings about foam breakage. Namely, the molten polymer flows in the cavity 7 in a state where the end portion is developing foam breakage, and this state is transferred onto the surface of the metal mold. The resin cools and solidifies on the surface of the metal mold and, therefore, swirl marks develop on the surface of the obtained preform 50 becoming a cause of surface roughness. On the other hand, if the gas is fed into the cavity 7 to hold the pressure therein high, then it is allowed to effectively prevent the occurrence of foam breakage while the molten polymer is being fluidized and, therefore, to effectively avoid the surface roughness caused by swirl marks and the like.

According to the present invention, further, the elevated pressure is held as the molten polymer continues to be injected. Namely, holding the elevated pressure makes it possible to effectively prevent the foaming from taking place in the cavity 7.

The molten polymer injected into the cavity 7 as described above is held therein under the application of pressure, and is imparted with the shape of a container preform 50 being cooled by the mouth portion metal mold 3a and the forming portion metal mold 3b. Next, the shell metal mold 3 (mouth portion metal mold 3a and forming portion metal mold 3b) and the core metal mold 5, which are executing the cooling, are opened, and the container preform 50 that is formed is taken out.

According to the present invention as described above, the cavity 7 holding a high pressure therein is filled with the molten polymer in which the gas is dissolved and is, further, applied with pressure making it possible not only to form the container preform 50 having a low degree of surface roughness without swirl marking but also to effectively suppress the foaming despite of dissolving the gas which is a foaming agent.

In executing the injection-molding as described above, there is no particular limitation on the pressure in the cavity 7. Usually, however, it is desired that the pressure is held in a range of not less than 1.0 MPa, and the molten polymer is injected into the cavity 7 in which the pressure is held as above. If the pressure is low, the foam breakage cannot be effectively suppressed when the molten polymer is being fluidized; i.e., swirl marks develop and the degree of surface roughness becomes high.

Further, the degree of holding pressure (pressure that is held and time) is suitably set depending on the amount of gas which is dissolved and the temperature of the resin so that the foaming can be reliably suppressed. To reliably prevent the foaming in the mouth portion 51, however, the degree of holding the pressure is so set that the weight reduction ratio becomes 0%. The weight reduction ratio can be experimentally found according to the following formula.

$$\text{Weight reduction ratio}=[(M_0-M_1)/M_0]\times 100$$

wherein,
$M_0$ is the weight of the preform obtained by the injection under the conditions where no inert gas is dissolved and no forming defect takes place, such as sink marks, and
$M_1$ is the weight of the gas-dissolved preform obtained by having the inert gas dissolved.

That is, the weight reduction ratio decreases with an increase in the pressure that is held. The weight reduction ratio also decreases with an increase in the time for holding the pressure. By utilizing these relations, therefore, the condition for holding the pressure can be so set that the weight reduction ratio becomes 0%.

<Foaming>

By injecting the molten polymer in which the gas is dissolved into the cavity 7 as described above, the preform 50 is shaped. After the preform 50 is cooled down to a predetermined temperature, the pressure is released. Next, the shell metal mold 3 (mouth portion metal mold 3a and forming portion metal mold 3b) and the core metal mold 5 are opened, and the preform 50 is taken out from the cavity 7. Here, in the hot-parison method, the preform 50 is introduced into the step of stretch-forming while the forming portion 53 thereof is still maintained at a temperature at which it can be stretch-formed. That is, according to the cold-parison method, the preform 50 is not readily introduced into the step of stretch-forming; i.e., the preform 50 is taken out from the cavity 7 after the metal mold has been sufficiently cooled down. According to the hot-parison method, on the other hand, the central portion of container wall of the forming portion 53 must be maintained, at least, at a temperature (not lower than a glass-transition temperature) at which it can be stretch-formed. This makes a great difference between the hot-parison method and the cold-parison method.

The outer surface and the inner surface of the container wall of the forming portion 53 do not necessarily have to be maintained at the stretch-formable temperature. This is because even after the preform 50 is taken out from the cavity 7, the temperature rises due to the heat conducted from the central portion of the container wall if the time is short (about 10 to about 30 seconds) before the preform 50 is introduced into the step of stretch-forming.

Here, the inert gas for foaming has been dissolved in the preform 50. Therefore, the foaming takes place if the temperature of the preform 50 is maintained to be higher than a temperature at which the forming starts taking place in a step where the pressure is released prior to taking the preform 50 out of the cavity 7. That is, the gas dissolved in the resin (in the preform 50) expands due to a pressure differential from the external pressure, and bubbles (foamed cells) grow due to the separation of phase between the gas and the resin.

In the present invention, the foaming is allowed to take place selectively in the forming portion 53 of the preform 50 but must not be allowed to take place in the mouth portion 51.

In the cavity 7 mentioned above, therefore, it is necessary that the mouth portion 51 of the preform 50 is cooled down to a temperature lower than a foam start temperature at a moment when the pressure is released. In this case, the outer surface and the inner surface of the mouth portion 51 are, respectively, in contact with the shell metal mold 3 (mouth portion metal mold 3a) and the core metal mold 5. Here, however, the central portion therein is not in contact with these metal molds, and the temperature in the central portion therein is higher than the temperatures on the outer surface and on the inner surface. To prevent the foaming from taking place in the mouth portion 51, therefore, the cooling must be conducted until the temperature becomes lower than the foam start temperature up to the central portion while holding the pressure. If the cooling is effected in a state where the pressure has not been held sufficiently, then the resin pressure decreases due to the shrinkage of resin caused by the cooling, and the foaming often takes place.

According to the present invention, therefore, the metal mold for cooling the mouth portion 51 has a large cooling capability to forcibly cool the mouth portion 51.

The foam start temperature is a temperature higher than the glass transition temperature (Tg) of the resin and is, usually, about 5 to about 15° C. higher than the glass transition temperature (Tg) though it varies depending on the amount of the dissolved inert gas.

Even after the foam start temperature is reached, a certain period of time is necessary before the bubbles are actually formed in many numbers and grow. In carrying out the stretch-forming by the hot-parison method, if the time from when the preform is taken out from the cavity until when it is stretch-formed is, for example, about 10 to about 30 seconds, then the substantial foam start temperature becomes about 15 to about 25° C. higher than the glass transition temperature (Tg).

On the other hand, the forming portion 53 of the preform 50 is a portion that is to be stretched and must, therefore, be maintained at a temperature at which it can be stretched and, besides, must be foamed. Therefore, though it is cooled in the cavity 7 down to a temperature lower than the melting point of the resin, the temperature in the central portion of the forming portion 53 in the cavity 7 must still be maintained at a temperature at which it can be stretched and foamed (at a temperature higher than the above-mentioned foam start temperature).

Here, like the foamable temperature, the stretchable temperature is a temperature higher than the glass transition temperature (Tg) of the resin, and, usually, lies in a range which is about 5 to about 15° C. higher than the glass transition temperature (Tg) but is lower than the melting point of the resin.

Further, though the central portion of the forming portion 53 must be maintained at the foamable temperature, it is also necessary that the outer surface and the inner surface of the forming portion 53 in the cavity 7 are maintained at the stretchable temperatures while at the same time being cooled down to temperatures lower than the foam start temperature. That is, if the outer surface and the inner surface of the forming portion 53 of the preform 50 are maintained at temperatures higher than the foam start temperature, then the foaming takes place in the outer surface and in the inner surface starting from a moment when the preform 50 is taken out from the cavity 7. Therefore, not only the surface smoothness is impaired but also the foaming takes place in the whole forming portion 53 causing a great decrease in the strength in the body wall 63 that corresponds to the forming portion 53 of the container 60 that is finally obtained and, further, greatly impairing the gas-barrier property.

In taking out the preform 50 from the cavity 7 in the present invention, therefore, the outer surface and the inner surface of the preform 50 have been cooled in either the mouth portion 51 or the forming portion 53 down to a region lower than the foam start temperature. It is the mouth portion 51 only in which the temperature has been cooled even up to its central portion down to a temperature lower than the foam start temperature. In the forming portion 53, the temperature in the central portion thereof has been maintained at a temperature higher than the foam start temperature.

Namely, to execute the cooling so as to form the above-mentioned temperature profile, use is made of the mouth portion metal mold 3a having a large cooling capability, the mouth portion 51 of the preform 50 is strongly cooled by the mouth portion metal mold 3a and core metal mold 5 having large cooling capability until the central portion, the inner surface and the outer surface thereof are all cooled down to temperatures lower than the foam start temperature. The forming portion 53 of the preform is weakly cooled compared to the mouth portion 51 by the forming portion metal mold 3b and core metal mold 5 having a small cooling capability. Namely, the inner and outer surfaces are cooled down to a temperature lower than the foam start temperature but the central portion thereof is maintained at a temperature higher than the foam start temperature.

As described above, the above-mentioned temperature profile is formed by conducting the cooling while adjusting the cooling time (residence time in the cavity 7) depending upon the cooling capabilities of the mouth portion metal mold 3a, forming portion metal mold 3b and core metal mold 5. Thereafter, the preform that is formed is taken out from the cavity 7 permitting the foaming to take place starting from the central portion of the forming portion 53.

Simultaneously with the start of foaming in the preform 50 taken out from the cavity 7, the heat flows toward the outer surface and the inner surface from the central portion where the temperature is maintained higher than the foam start temperature; i.e., the region that assumes the foamable temperature gradually expands toward the outer surface side and the inner surface side and accompanying this, the foaming gradually proceeds toward the outer surface side and the inner surface side from the central portion of the forming portion 53.

To reliably prevent the foaming from taking place in the outer surface and in the inner surface of the forming portion 53 before the stretch-forming due to the heat conducted from the central portion of the forming portion 53 after the preform 50 is taken out from the cavity 7, it is desired that the outer surface and the inner surface have been cooled down to a temperature region higher than the stretch-formable temperature but lower than the foam start temperature at a moment when the preform 50 is taken out from the cavity 7. However, if the temperature is elevated up to the stretch-formable temperature but is not elevated to be higher than the foam start temperature before the stretch-forming, then the outer surface and the inner surface may be cooled down to a temperature region lower than the stretch-foamable temperature.

FIG. 4 shows sectional views of the forming portion 53 at a moment when the preform 50 obtained by foaming mentioned above is introduced into the step of stretch-forming. In the forming portion 53 as is obvious from these views, foamed cells A are formed due to foaming having a shape close to the spherical shape and assuming a basic structure in that the foamed cells $A^1$ positioned in the central portion O have the largest diameter. This is because due to the cooling by the metal molds, the resin temperature remains the highest in the central portion O and gradually drops toward the outer surface side and the inner surface side.

According to the present invention, the temperatures of the inner and outer surfaces of the forming portion 53 are controlled after the preform 50 is taken out from the cavity 7 to adjust the distributed state of the foamed cells yet maintaining the above basic structure. This makes it possible to obtain the stretch-foamed container of the above-mentioned normally distributed type, locally distributed type or very finely foamed type. FIGS. 4(a) to (c2) are sectional views of the forming portions 53 of the preforms 50 corresponding to the above types of distribution. The distributed states of the foamed cells will now be described.

1. Forming Portion Corresponding to the Normally Distributed Type.

In the forming portion 53 of the preform 50 shown in FIG. 4(a), the foamed cells are normally distributed starting from the central portion O of the container wall.

That is, if the foaming is allowed to take place by maintaining the central portion of the forming portion 53 at a temperature higher than the foam start temperature as described above, then the foaming proceeds up to the outer surface and the inner surface of the forming portion 53 depending on the cases. If the foaming takes place entirely, then the surface smoothness is impaired and the container that is finally obtained has decreased strength and gas-barrier property. It is, therefore, desired that after the preform 50 is taken out from the cavity 7, the temperature rises in the peripheries due to the heat from the central portion O of the forming portion 53 but the temperatures on the outer surface and inner surface of the forming portion 53 are still maintained to be lower than the foam start temperature.

Here, even if the foam start temperature is reached on the inner and outer surfaces due to the conduction of heat before the stretch-forming, the stretch-forming can be executed maintaining the state where no foaming is taking place near the inner and outer surfaces provided the time is not long enough for forming bubbles and growing bubbles.

To adjust the temperature as described above, the cooling in the cavity 7 may be so effected that the temperature differential becomes large between the central portion O of the forming portion 53 and the inner and outer surfaces, e.g., the cooling may be conduct for a period of time as short as possible. Further, setting the thickness D of the forming portion 53 of the preform 50 to be relatively large (e.g., not less than 2.5 mm) is effective in increasing the temperature differential between the central portion O of the forming portion 53 and the inner and outer surfaces.

In the forming portion 53 of the preform 50 that is foamed as described above, the structure of distribution of the foamed cells A becomes as shown in FIG. 4 (a) when it is introduced into the step of stretching. Concretely, a foamed layer $X^1$ in which the foamed cells A are present is formed in a region inclusive of the central portion O, and unfoamed layers Y in which no foamed cell A is present are formed on the outer surface side and on the inner surface side.

The unfoamed layer Y in which no foamed cell is present is a layer where the foamed cells, even if they happen to be present, have very small cell diameters (diameters of almost circular cells) (e.g., not larger than 50 μm) and their number is very small, and is not quite having the basic function as the foamed layer (e.g., reducing the weight). In the unfoamed layer Y, for example, the cell density is not more than $1\times10^4$ cells/cm$^3$, and the foaming ratio is less than 3%.

The thicknesses of the thus formed foamed layer $X^1$ and the unfoamed layers Y are set to lie in suitable ranges depending on the use and the like of the foamed and stretched container that is finally obtained. The thicknesses of these layers can be adjusted relying upon the temperature of the central portion O of the forming portion 53 or on the temperatures on the inner and outer surfaces of when it is taken out from the cavity 7.

That is, if the temperature of the central portion O of the forming portion 53 is close to the foam start temperature, then the temperature in the central portion drops down to be lower than the foam start temperature within a short period of time after the preform 50 is taken out from the cavity 7 and, therefore, the foaming no longer takes place; i.e., the foamed layer $X^1$ acquires a small thickness and the unfoamed layers Y acquire large thicknesses.

Further, if the temperatures are low on the inner and outer surfaces of the forming portion 53, the temperatures near the inner and outer surfaces are not easily elevated to be higher than the foam start temperature. As a result, the unfoamed layers Y are thickly formed in the inner and outer surfaces.

Of the above unfoamed layers Y, further, the unfoamed layer Y on the outer surface side of the container wall tends to acquire a thickness larger than a thickness of the unfoamed layer Y on the inner surface side of the container wall. This is because the atmosphere on the inner surface side of the forming portion 53 has a temperature higher than that on the outer surface side and, therefore, the foaming tends to proceed toward the inner surface side due to the heat conducted from the central portion O.

The foaming continues after the preform 50 is taken out from the cavity 7 until the temperature in the central portion O of the forming portion 53 drops down to become lower than the foam start temperature. If, for example, the temperature in the central portion O of the forming portion 53 is higher than the foam start temperature, the foaming continues up to the next step of stretch-forming.

To secure a suitable degree of light-blocking capability by foaming, it is desired that the foamed cells $A^1$ (before stretched) formed by foaming have diameters (diameters of almost circular cells) on average of about 50 to about 300 μm in the central portion O of the forming portion 53, and that the cell density is not less than $1\times10^4$ cells/cm in the central portion O. The cell diameters and the cell density can be adjusted by controlling the amount of dissolved inert gas, cooling condition such as cooling time and the foaming time (period).

Here, the foamed cells $A^1$ in the central portion O stand for the foamed cells present being overlapped in the central portion O (center line).

With the preform 50 having the foamed structure of the normally distributed type, further, it is desired that the forming portion 53 (foamed region) has a thickness D of not less than 2.5 mm when it is to be introduced into the step of stretch-forming as described earlier, and that the total thickness of the unfoamed layers Y on the inner surface side and on the outer surface side is in a range of 20 to 70% and, specifically, 30 to 60% of the thickness D of the container wall in the forming portion 53. Upon setting the thickness of the unfoamed layers Y to lie in the above range, it is allowed to effectively avoid inconvenience such as increase in the surface roughness caused by foaming when the thickness is reduced in the step of stretching that will be described later.

Figure 5:
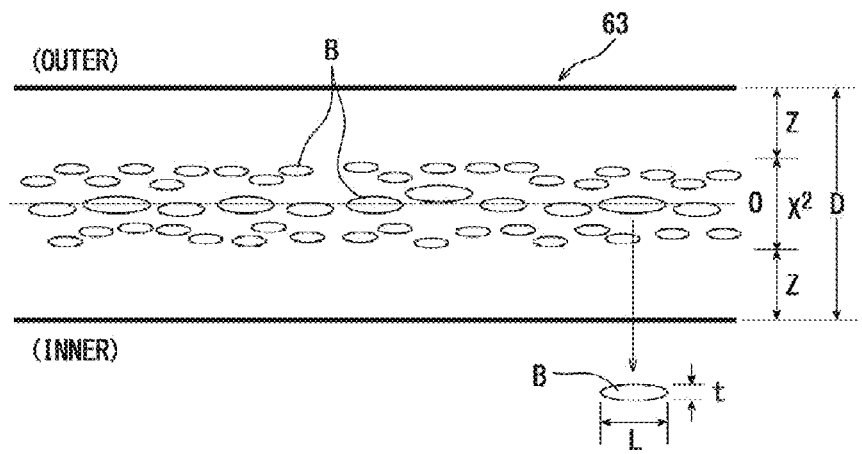
FIG. 5 is a sectional view showing the state of distribution of flatly foamed cells in the body wall (foamed region) of the foamed and stretched container obtained from the foamed preform that has the foamed structure of the normally distributed type shown in FIG. 4(*a*).

From the above forming portion 53 of the preform 50, there is obtained a foamed and stretch-formed container forming, in the body wall thereof, a foamed region as shown in FIG. 5.

2. Forming Portion Corresponding to the Locally Distributed Type:

At the time of the foaming, further, if the forming portion 53 is positively heated from the inner surface side thereof after the preform 50 is taken out from the cavity 7, the foamed cells A are distributed in a structure as shown in FIG. 4 (b1) or FIG. 4 (b2).

That is, foamed cells A of a shape close to the spherical are formed by foaming. Here, if the preform 50 (forming portion 53) is heated from the inner surface side thereof, the relative temperature distribution from the inner surface side toward the outer surface side of the forming portion 53 becomes such that, as shown in FIG. 4 (b1), the central portion O and the inner surface acquire high temperatures, the portion between the central portion O and the inner surface acquires an intermediate temperature, and the outer surface acquires the lowest temperature. That is, due to the above temperature profile, the foamed cells A having large diameters are formed in the central portion O and on the inner surface side, the foamed cells A having smaller diameters are formed in the portion between the central portion O and the inner surface, and on the outer surface side from the central portion O. Moreover, a layer containing no foamed cell A is formed on the outer surface side.

Referring, for example, to FIG. 4 (b1), the region from the inner surface up to slightly on the outer surface side of the central portion O is the foamed layer $X^1$ where the foamed cells A are present and, at least, the foamed cells A are distributed from the central portion O up to the inner surface as a whole. On the outer surface side thereof is the unfoamed layer Y where no foamed cell is present.

Even if the foaming is attained as described above, the foaming shall not take place from the central portion O toward the outer surface. If the foaming takes place entirely up to the outer surface (i.e., no unfoamed layer Y is formed), then the surface smoothness is impaired, appearance of the container is marred and, besides, the container loses properties such as strength, gas-barrier property and the like as described earlier. It is, therefore, necessary that after the preform 50 is taken out from the cavity 7, the temperature on the outer surface of the forming portion 53 is maintained to be lower than the foam start temperature for a period of time (usually, several tens of seconds) until the stretch-forming is finished though the temperature in the periphery may rise due to the heat conducted from the central portion O of the forming portion 53.

To adjust the temperature as described above, it is desired that the temperature on the outer surface of the forming portion 53 is, for example, lowered as much as possible on condition that the temperature is still in a range in which the stretch-forming can be executed. It is, further, allowable to prevent the temperature on the outer surface from rising higher than the foam start temperature by blowing the cold air to the outer surface after the preform 50 is taken out from the cavity 7 until the preform 50 is transferred to the step of stretch-forming (foaming takes place during this period). Moreover, setting the thickness d of the forming portion 53 of the preform 50 to be relatively large, e.g., to be not less than 2.5 mm, is also effective in increasing the temperature differential between the central portion O and the inner and outer surfaces of the forming portion 53.

The thicknesses of the foamed layer $X^1$ and the unfoamed layers Y are set to lie in suitable ranges depending on the use of the foamed and stretched container that is finally obtained. The thicknesses of these layers can be adjusted depending on the temperature of the central portion O or the temperature of the outer surface of the forming portion 53 of when it is taken out from the cavity 7.

That is, if the temperature in the central portion O of the forming portion 53 is close to the foam start temperature, then the temperature in the central portion O drops down to become lower than the foam start temperature in a short period of time after the preform 50 is taken out from the cavity 7, the foaming ceases to take place (or the region becomes narrow where the temperature becomes higher than the foam start temperature from the central portion O). Therefore, the foamed layer $X^1$ acquires a decreased thickness whereas the unfoamed layer Y acquires an increased thickness.

Further, the lower the temperature on the outer surface of the forming portion 53, the more it becomes difficult for the temperature near the outer surface to become higher than the foam start temperature. As a result, the unfoamed layer Y is thickly formed on the outer surface side.

It is, usually, desired that the thickness of the unfoamed layer Y is in a range of about 10 to about 35% of the thickness D of the forming portion 53 from the standpoint of obtaining the foamed and stretched container utilizing the advantage of foaming to a maximum degree while effectively preventing the appearance from being hindered by foaming.

The diameters of the foamed cells $A^1$ in the central portion O of the forming portion 53 formed by foaming and the cell density in the central portion O are, desirably, in the same ranges as those of the normally distributed type described above, i.e., the average cell diameters are about 50 to about 300 μm and the cell density is not less than $1\times10^4$ cells/cm$^3$ from the standpoint of maintaining a suitable degree of light-blocking capability by foaming. The cell diameters and the cell density can be adjusted by controlling the amount of the dissolved inert gas, cooling condition such as cooling time and the foaming time (period).

At the time of foaming, further, the inner surface is suitably heated so that the foamed cells $A^1$ in the central portion O acquires a maximum diameter and the foamed cells $A^2$ distributed in the inner surface layer (see FIG. 4 (b1)) acquire diameters not larger than the diameters of the foamed cells $A^1$ in the central portion O. This is because if the foamed cells $A^2$ distributed in the inner surface layer acquire too large diameters, not only the number of the foamed cells A decreases but also the strength decreases, forming becomes defective and gas-barrier property becomes inferior due to foaming.

In FIG. 4 (b1), further, the foamed cells $A^2$ have diameters nearly the same as the diameters of the foamed cells $A^1$ in the central portion O and, therefore, a foamed structure is formed in that the foamed cells $A^3$ of diameters smaller than both of them are distributed like a layer between the inner surface layer and the central portion O.

In the foamed preform 50 having the above foamed structure, the foamed cells A are formed in many number and, besides, are overlapped one upon the other offering a great advantage for the production of foamed and stretched containers having excellent light-blocking capability.

Further, by lowering the heating temperature (e.g., by heating at a temperature close to the glass transition point Tg) by mildly setting the degree of heating the inner surface as compared to FIG. 4(b1), it is allowed to form finely foamed cells $A^4$ at a high density in the inner surface layer as shown in FIG. 4(b2). In this case, too, foamed cells are formed due to the heat conducted from the central portion O and from the inner surface layer. Therefore, the foamed cells $A^1$ having the largest diameter are distributed in the central portion O, the foamed cells A are formed from at least the central portion O up to the inner surface layer as a whole, and a considerably large number of small foamed cells $A^4$ are distributed on the side of the inner surface layer. In the foamed and stretched container obtained from the preform of the above foamed structure, foamed cells having very short lengths are formed in very many numbers on the inner surface side to further improve the light-blocking capability.

In FIG. 4 (b2), for example, it is desired that the average cell diameter in a region Q from the inner surface of the forming portion 53 to a depth of 25% of the whole thickness D, is about 20 to about 100 μm on condition that they are smaller than the average diameter of the foamed cells $A^1$ in the central portion O, and that the cell density in the region Q is about $1\times10^5$ to about $1\times10^8$ cells/cm$^3$ and, specifically, about $5\times10^5$ to about $1\times10^8$ cells/cm$^3$. This is because, if the average diameter of the finely foamed cells $A^4$ in the region Q is too large or if the cell density therein is too large, then the strength decreases and the gas-barrier property is hindered by foaming to a conspicuous degree.

The preform 50 can be easily heated from the inner surface side thereof by, for example, inserting a rod-like metal such as iron core heated by high-frequency induction heating or the like in the preform 50 that is taken out from the cavity 7, and transferring the preform 50 to the step of stretch-forming.

Figure 6:
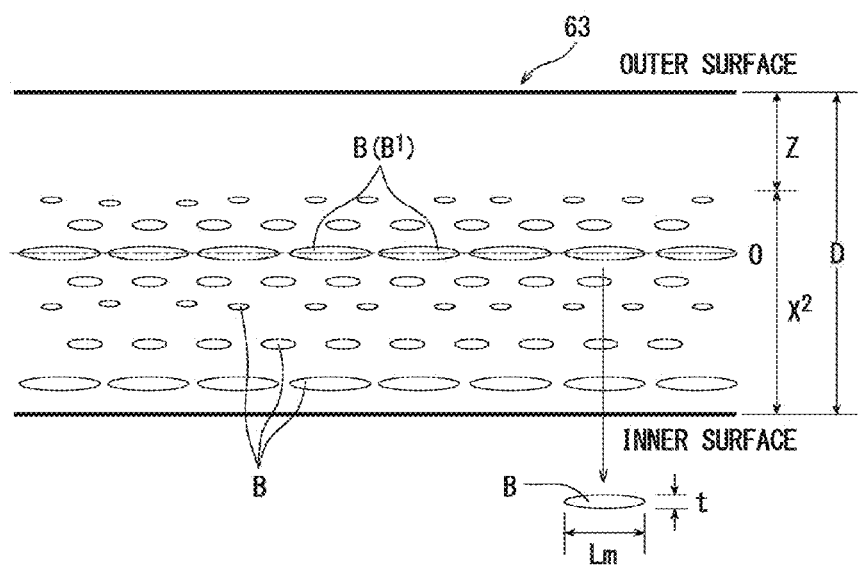
FIG. 6 is a sectional view showing the state of distribution of flatly foamed cells in the body wall (foamed region) of the foamed and stretched container obtained from the foamed preform that has the foamed structure of the locally distributed type shown in FIG. 4(*b*1).
Figure 7:
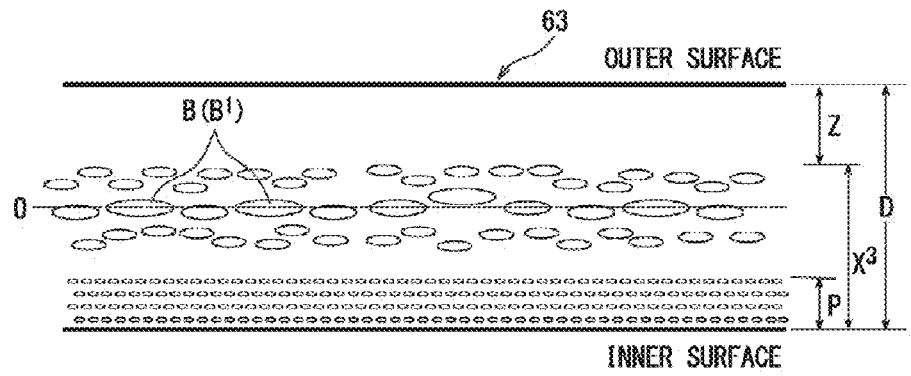
FIG. 7 is a sectional view showing the state of distribution of flatly foamed cells in the body wall (foamed region) of the foamed and stretched container obtained from the foamed preform that has the foamed structure of the locally distributed type shown in FIG. 4(*b*2).

From the above forming portion 53 of the preform 50, there is obtained a foamed and stretch-formed container forming, in the body wall thereof, a foamed region as shown in FIG. 6 or FIG. 7.

3. Forming Portion Corresponding to the Very Finely Foamed Type:

In the foamed structure of the very finely foamed type shown in FIGS. 4(c1) and (c2), there are formed very finely foamed layers 20 in which foamed cells having very fine cell diameters are distributed at a high density in the outer surface layer and/or in the inner surface layer of the forming portion 53.

For example, the foamed structure of the normally distributed type shown in FIG. 4(a) described above is realized by positively heating neither the inner surface side nor the outer surface side of the forming portion 53 after the preform is taken out from the mold cavity 7. The foamed structure of the locally distributed type shown in FIGS. 4(b1) and (b2) described above is realized by positively heating the inner surface side of the forming portion 53 after the preform 50 is taken out from the mold cavity 7. On the other hand, the foamed structure of the finely foamed type shown in FIGS. 4(c1) and (c2) is realized without positively effecting the heating from the outer side at the time when the preform 50 is taken out from the mold cavity 7 but setting the temperatures on the outer surface and/or the inner surface of the forming portion 53 to be close to the glass transition point (Tg) of the resin.

That is, the formed body (preform 50) with which the cavity 7 is injection-molded and assuming a predetermined shape, contains the inert gas for foaming dissolved therein. Therefore, if, for example, the temperature thereof becomes not lower than the foam start temperature under the atmospheric pressure, then the foaming takes place in the step when the metal mold 3 is opened. That is, the gas dissolved in the resin (preform) expands due to a pressure differential from the external pressure, and bubbles (foamed cells) grow due to the separation of phase between the gas and the resin.

The foam start temperature, as described earlier, is a temperature higher than at least the glass transition temperature (Tg) of the resin, i.e., a temperature about 5 to about 15° C. higher than the glass transition temperature (Tg) under the atmospheric pressure though it may vary depending on the mount of the dissolved inert gas or the thickness of the formed body. Upon maintaining this temperature, the foamed cells are allowed to grow. The rate of growth of the foamed cells become large as the temperature rises (i.e., if the resin is softer).

In the present invention, to form the very finely foamed layer 20 in the surface layer on the outer surface side or the inner surface side of the forming portion 53 as shown in FIG. 4 (*c*1) or FIG. 4 (*c*2) it is necessary that the foaming is reliably prevented from taking place in the cavity 7 and that the foaming is allowed to take place after the preform is taken out from the cavity 7 without the need of positive heating from the external side. This is because if the foaming takes place in the cavity 7 or is caused to take place by the positive heating from the external side after the preform is taken out from the cavity, the foamed cells acquire large diameters and merge together making it difficult to form very finely foamed cells A.

Here, what is meant by without effecting the positive heating is without at all effecting the heating, or is that even if the heating is effected, it is a very weak heating (e.g., maintaining the temperature at which the stretch-forming can be executed) that does not cause very finely foamed cells to grow excessively.

To form the very finely foamed layer 20 in the surface layer portion on the outer surface side or the inner surface side relying on the foaming so as to satisfy the above conditions, the cooling condition is adjusted by the metal molds, and the temperature in the surface layer of the forming portion 53 where the very finely foamed layer 20 is to be formed is set to be close to the glass transition point of the resin (specifically, in a region not lower than Tg but not higher than Tg+25° C.). When, at least, the surface layer portion of the forming portion 53 is cooled down to at least the above temperature region, the pressure is released and the metal molds are opened. It is, further, necessary to so adjust the amount of the gas that is dissolved that the foaming takes place under the above conditions.

For example, when the temperature in the surface layer portion on the outer surface side is cooled down to lie in the above temperature range in the cavity 7 and when the pressure is released and the metal molds are opened, the very finely foamed layer 20 is formed in the surface layer portion on the outer surface side. Further, when the temperature in the surface layer portion on the inner surface side is cooled down to lie in the above temperature range and when the pressure is released and the metal molds are opened, the very finely foamed layer 20 is formed in the surface layer portion on the inner surface side.

In FIG. 4(*c*1), the very finely foamed layer 20 is formed in the surface layer portion on both the outer surface side and the inner surface side and in FIG. 4(*c*2), the very finely foamed layer 20 is formed in the surface layer portion on the outer surface side only.

The reason has not yet been clarified why in the invention the above very finely foamed layer 20 is formed upon adjusting the temperature in the surface layer portion to be close to the glass transition point of the resin. This, however, is presumably due to that the glass transition point is nearly the lower-limit temperature at which the bubbles can be formed, and upon opening the metal mold at such a temperature, the pressure that had been applied to the surface layer portion decreases down to the atmospheric pressure at once, and the quickly created pressure differential, too, serves as a factor for forming very finely foamed cells A. In fact, the foamed cells $A^5$ in the very finely foamed layer 20 have very small cell diameters (not more than 15 μm and, specifically, not more than 10 μm). The thickness t of the very finely foamed layer 20 is very small, e.g., about 30 to about 100 μm telling the fact that the very finely foamed layer 20 is formed instantaneously.

If the external pressure is settled to the atmospheric pressure, the very finely foamed cells $A^5$ do not grow any more unless the temperature is elevated to exceed the above-mentioned foam start temperature. After the preform 50 (forming portion 53) is taken out from the mold cavity 7, therefore, the temperature in the surface layer portion (very finely foamed layer 20) should be maintained so will not to exceed the foam start temperature. Or even if the foam start temperature is exceeded, the temperature may be elevated (or maintained) in a temperature range in which the foamed cells grow very slowly.

When the very finely foamed layer 20 is formed as described above, too, the forming portion 53 of the preform 50 of when it is taken out from the mold cavity 7 has a temperature profile; i.e., the surface layer portion in contact with the metal mold has the lowest temperature and the central portion O has the highest temperature. Like the distribution structure of FIG. 4(*a*), FIG. 4(*b*1) or FIG. 4(*b*2), therefore, i.e., even if the temperature in the surface layer portion (very finely foamed layer 20) is cooled down to near the glass transition point, the temperature in the surface layer portion rises again due to the conduction of heat after the preform is taken out from the mold cavity.

To stably form the very finely foamed layer 20 as will, therefore, be understood from the above, the foamed structure is controlled by taking into consideration the rise of the temperature due to the conduction of heat from the central portion and by also utilizing the rise of the temperature.

When, for example, the very finely foamed layer 20 is to be formed in the surface layer portion on both the outer surface side and the inner surface side as shown in FIG. 4 (*c*1), the metal mold temperature and the metal mold cooling time are so adjusted that the temperatures in the surface layers portion of the outer surface side and the inner surface side are both close to the glass transition point and, at the same time, that the temperature in the central portion O is maintained to be higher than the foam start temperature when the preform 50 (forming portion 53) is taken out from the mold cavity 7.

By so controlling the temperatures, the foaming starts taking place in the central portion O of the forming portion 53 from a moment when the formed body is taken out from the mold cavity (or, depending upon the cases, when the pressure is released), and the foaming proceeds toward the surface layers portion on the outer surface side and the inner surface side due to the heat conducted from the central portion O. Therefore, the foamed core layer X is formed in the central portion O containing foamed cells $A^1$ of the largest diameters distributed therein, and the very finely foamed layer 20 is formed in the outer surface portion and in the inner surface portion, respectively.

As shown in FIG. 4 (*c*1), further, it is desired that the unfoamed layers Y are formed among the very finely foamed layers 20 and the foamed core layer X. That is, by avoiding the merging among the very finely foamed layers 20 and the foamed core layer X, it is allowed to reliably prevent the foamed cells (very finely foamed cells $A^5$) from becoming large in the very finely foamed layers 20.

To form the unfoamed layers Y of a suitable thickness among the very finely foamed layers 20 and the foamed core layer X, the temperatures near the very finely foamed layers 20 may be maintained to be not higher than the foam start temperature. For this purpose, there can be employed means such as blowing the cold air or readily cooling the metal molds used for the subsequent secondary forming (stretch-forming, etc.). There can be, further, employed means for adjusting the conditions for cooling the metal mold so that the temperature in the central portion O of the forming portion 53 becomes as close to the foam start temperature as possible when the forming portion 53 is taken out from the mold cavity 7. Or the above means may be used in combination.

To attain the foamed structure of the pattern shown in FIG. 4 (*c*1), a large temperature differential must be formed among the surface layers portion of the forming portion 53 and the central portion O thereof when the forming portion 53 is taken out from the metal mold and, besides, after the forming portion 53 is taken out from the metal mold, the temperature in the surface layers portion (very finely foamed layers 20) must not be elevated by the heat from the central portion O to exceed the foam start temperature. Moreover, unfoamed layers Y must be formed among the very finely foamed layers 20 and the foamed core layer X. It is, therefore, desired that a large thickness D is possessed by the forming portion 53 of the preform 50 in which the foamed regions of the above foamed structure are formed, the thickness D being, desirably, not less than 2 mm.

The thickness d of the unfoamed layers Y among the very finely foamed layers 20 and the foamed core layer X may be such that the foamed cells A of large diameters grown from the central portion O to form the foamed core layer X do not meet together with the very finely foamed cells $A^5$ even when stretched as will be described later, and is, usually, not less than 30 µm and, specifically, in a range of about 30 to 120 µm.

When the very finely foamed layers 20 are formed, further, the external heating can be effected from the inner surface side like in the case of the foamed structure of the above locally distributed type. This enables the very finely foamed layer 20 to be formed in the surface layer portion of the outer surface side only as shown in FIG. 4(*c*2). In the surface layer portion on the inner surface side, there is formed a finely foamed layer 25 which contains finely foamed cells $A^4$ of a diameter larger than that of the very finely foamed cells $A^5$ but smaller than that of the foamed cells $A^1$ in the central portion O, the finely foamed layer 25 being continuous to the foamed core layer X.

That is, to form the foam distribution structure of FIG. 4(*c*2), the external heating is effected from the side of the inner surface layer portion after the preform 50 (forming portion 53) is taken out from the mold cavity 7 though the cooling conditions in the mold cavity 7 are quite the same as those of the case of forming the distribution structure of FIG. 4(*c*1). Upon conducting the external heating as above, there can be formed the finely foamed layer 25 continuous to the foamed core layer X.

In the above finely foamed layer 25 as described above, the diameter of the foamed cells $A^4$ forming the finely foamed layer 25 can be adjusted by the heating temperature of the external heating; i.e., the diameter of the foamed cells $A^4$ increases as the temperature increases and the diameter of the foamed cells $A^4$ decreases as the temperature decreases. By setting the conditions of the external heating to lie in a suitable range, therefore, the average diameter of the foamed cells $A^4$ can be set to lie in a predetermined range. For example, in the region Q of a depth of up to 500 µm from the inner surface of the forming portion 53, it is desired that the average cell diameter is about 20 to about 100 µm on condition that the average cell diameter thereof is smaller than the average diameter of the foamed cells $A^1$ in the central portion O but is larger than the average diameter of the very finely foamed cells $A^5$. It is, further, desired that the cell density in the above region Q is in a range of about $5 \times 10^5$ to about $1 \times 10^8$ cells/cm$^3$ from the standpoint of suppressing a decrease in the strength and in the gas-barrier property caused by foaming.

As the external heating means as described earlier, there can be employed a suitable means depending on the size and shape of the forming portion 53 of the preform 50, such as heating by the hot air or a heater or inserting the iron core heated by high-frequency heating.

It is desired that the foamed structure of the pattern shown in FIG. 4 (*c*2), too, forms a large temperature differential by the metal mold cooling and, therefore, that the forming portion 53 has a large thickness D in a range of, for example, not less than 2 mm.

As described above, it is allowed to form the forming portion of a foam distribution structure of the normally distributed type, locally distributed type or very finely foamed type. The foamed region where the foamed cells are distributing as described above is, usually, formed in the whole forming portion 53 that corresponds to the body wall of the container that is finally obtained but can also be formed in only a portion of the forming portion 53, as a matter of course. To form the unfoamed region containing no foamed cell in only a portion of the forming portion 53, the whole region from the surface layer portion up to the central portion in a predetermined portion of the forming portion 53 may be cooled to acquire a temperature lower than the foam start temperature by cooling the metal mold in the same manner as is done for the mouth portion.

Figure 8:
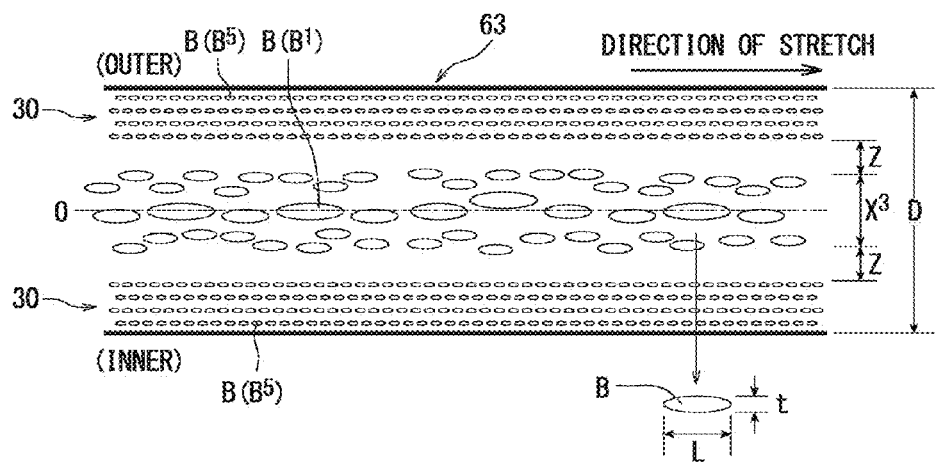
FIG. 8 is a sectional view showing the state of distribution of flatly foamed cells in the body wall (foamed region) of the foamed and stretched container obtained from the foamed preform that has the very finely foamed structure shown in FIG. 4(*c*1).
Figure 9:
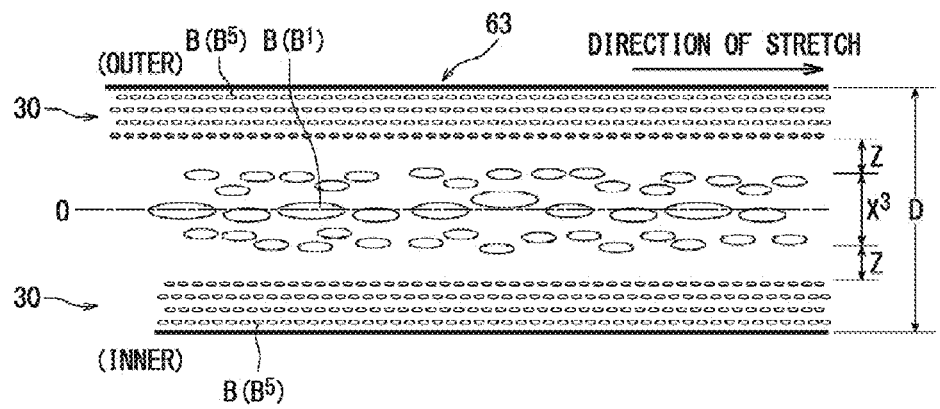
FIG. 9 is a sectional view showing the state of distribution of flatly foamed cells in the body wall (foamed region) of the foamed and stretched container obtained from the foamed preform that has the very finely foamed structure shown in FIG. 4(*c*2).

Foamed and stretch-formed containers forming, in the body walls thereof, the foamed regions shown in FIGS. 8 and 9, can be obtained from the forming portions 53 of the preforms 50 having distribution structures of the above-mentioned very finely foamed types shown in FIGS. 4(*c*1) and (*c*2).

<Stretch-Forming and Containers>

In the present invention, the foamed preform 50 having the above-mentioned foam distribution structure formed in the forming portion 53 thereof is subjected to the stretch-forming such as blow-molding while the temperature in the forming portion 53 is still maintained at a temperature at which it can be stretch-formed. Thus, as shown, for example, in FIG. 3, there is obtained a foamed and stretched container 60 having a mouth portion 61 inclusive of a threaded portion 61*a* and a support ring 61*b* and having a body wall 63, which are corresponding to the preform 50.

Namely, in the above container, the body wall 63 represents the forming portion 53 of the preform 50 and, like in the forming portion 53, the lower end of the body wall 63 is closed to form a bottom portion 65. The body wall 63 is the foamed region where the foamed cells are present, whereas the mouth portion 61 is the unfoamed region where there is present quite no foamed cell.

The present invention forms the stretch-formed container by utilizing the hot-parison method, from the formation of the preform 50 through up to the formation of the stretch-formed container 60 without interruption or concretely, stretch-forming the preform by transferring it to the step of stretch-forming maintaining the temperature in the central portion of the forming portion 53 of the preform at a stretch-formable temperature. As the stretch-forming employed by the present invention, therefore, there is usually used the known blow-molding. If the container to be formed has a mouth portion which serves as a port for taking out the content contained therein and on which a cap or a lid is to be fitted, however, there can be used a vacuum-forming as represented by the plug-assist forming, as a matter of course.

If the preform 50 of which the forming portion 53 is maintained in a stretch-formable temperature range of not lower than the glass transition point (Tg) but is lower than the melting point, is stretched, the wall of the forming portion 53 is stretched and, at the same time, the foamed cells A of a spherical shape or a shape close to the sphere formed in the forming portion 53, too, are stretched in the direction of stretch to assume a flat shape. FIGS. 5 to 9 are the sectional views, along the direction of a maximum stretch, of the body walls 63 (foamed regions) of the foamed and stretched containers 60 obtained through the stretching being corresponded to the above-mentioned foam distribution structure shown in FIG. 4. As will be learned from these drawings, the foamed cells B of the flat shape located in the central portion O of the body wall 63 assume the largest length L in the direction of maximum stretch being corresponded to the forming portion 53.

In the following description, the length of the foamed cells B of the flat shape stands for a length in the direction of maximum stretch unless stated otherwise.

Though there is no specific limitation on the stretching condition, it is desired that the stretching is conducted by setting the stretching conditions such as stretching ratio by taking into consideration the size of the foamed cells A ($A^1$) of the spherical shape in the central portion O of the forming portion 53 of the preform 50 so that the length L of the foamed cells B of the flat shape has a length L of, for example, not more than 1000 μm and a thickness t of not more than about 100 μm in the central portion O. That is, upon setting the size of the flatly foamed cells B to lie in the above range in the central portion O, a high light-blocking capability is attained in the whole foamed region making it possible to effectively avoid a decrease in the strength or in the gas-barrier property caused by foaming.

In the blow-molding which effects the stretching in the biaxial directions, i.e., in the axial direction (direction of height) and in the circumferential direction, for example, the stretching is effected in these directions into about 2 to about 4 times. In the plug-assist forming which effects the stretching in only one direction, i.e., in the axial direction, the stretching is effected to a maximum degree in this direction. Upon conducting the stretching at the same ratio as above, therefore, the flatly foamed cells B are formed in the above-mentioned size.

In conducting the stretch-forming, the mouth portion 51 of the preform 50 is a portion that is not stretched and is not heated. Namely, this portion is never heated to be higher than the foam start temperature, and the mouth portion 61 of the obtained container 60 becomes the unfoamed region where quite no foamed cell is present. This makes it possible to effectively prevent the mouth portion 61 from losing the strength or assuming rough surface caused by foaming and, therefore, to effectively maintain sealing with the cap, engagement with the cap, and adhesion with a sealing foil such as metal foil without impaired by foaming.

As shown in FIGS. 5 to 9, the flatly foamed cells B are distributed in the foamed region of the body wall 63 being corresponded to the distributed structure of the foamed cells A in the forming portion 53 of the preform 50.

The structure of distribution of the flatly foamed cells B will now be described.

1. Body Wall 63 of the Foamed Structure of the Normally Distributed Type:

By using the preform 50 having the forming portion 53 which has the foamed structure of, for example, the normally distributed type of FIG. 4(a), there is formed, in the body wall 63, the foamed structure in which the foamed cells B of the flat shape are normally distributed as shown in FIG. 5. As will be learned from FIG. 5, the foamed cells A are stretched in the direction of stretch and turn into the flatly foamed cells B which form the foamed layer $X^2$.

On the outer surface side and the inner surface side of the container, further, there are formed unfoamed layers Z where no foamed cell B is present being corresponded to the forming portion 53 of the preform 50 (see FIG. 4(a)).

This stretch-forming, i.e., flattening of the foamed cells helps increase the degree of overlapping of the foamed cells and greatly increase the light-blocking capability.

In the preform 50, further, the foamed cells $A^1$ located in the central portion O have the largest diameter which gradually decreases toward the outer surface side and the inner surface side. Corresponding thereto, the foamed cells B flattened by stretching, i.e., the flatly foamed cells $B^1$ located in the central portion O have the largest length L in the direction of maximum stretch, the length L gradually decreasing toward the outer surface side and the inner surface side.

In the foamed structure of the normally distributed type, it is desired that the lengths of the flatly foamed cells B are distributed to lie in a predetermined range in the body wall 63 that is stretched. Concretely, the ratio (Lm/Ls) of the length Lm of the flatly foamed cells $B^1$ positioned in the central portion O and the length Ls of the flatly foamed cells B present close to the outermost surface or the innermost surface, is, desirably, adjusted to lie in a range of about 1 to about 15 and, specifically, about 1.5 to about 7. The above distribution of lengths makes it possible to effectively utilize the advantages of foaming such as obtaining light-blocking capability, reducing the weight, etc. without accompanied by inconvenience such as decrease in the strength caused by foaming. For example, if the above ratio (Lm/Ls) is too great, the flatly foamed cells $B^1$ become unnecessarily large in the central portion O causing a decrease in the strength of the container 60 which may then break easily. If the above ratio (Lm/Ls) is too great, further, the thickness of the region $X^2$ decreases where the flatly foamed cells B are present, the foamed cells B overlap less one upon the other, and the light-blocking capability may decrease.

The distribution of lengths (Lm/Ls) of the flatly foamed cells B can be easily adjusted by controlling the temperature in the central portion of the forming portion 53 at the time of cooling the preform 50 in the cavity 7. Namely, in taking out the preform 50 from the cavity 7, the diameter of the foamed cells A increases as the temperature is maintained high in the central portion by shortening the cooling time and, therefore, the length Lm of the flatly foamed cells $B^1$, too, increases. Based on this, the value of Lm/Ls can be adjusted.

As for the structure of foam distribution in the body wall 63, the unfoamed layer Y on the inner surface side tends to possess the thickness smaller than the thickness of the unfoamed layer Y on the outer surface side in the forming portion 53 (foamed region) of the preform 50. As for the unfoamed layers Z formed in the inner and outer surfaces of the body wall 63, in this connection, the unfoamed layer Z on the inner surface side tends to possess the thickness smaller than the thickness of the unfoamed layer Z on the outer surface side. This is because when the preform 50 is taken out from the cavity 7 as described earlier, the atmosphere on the inner surface side of the forming portion 53 has a temperature higher than that on the outer surface side and, therefore, the foaming tends to proceed toward the inner surface side due to the heat conducted from the central portion.

The thicknesses of the unfoamed layers Z formed on the inner surface side and the outer surface side may vary depending on the use and the thickness of the container wall. Usually, in connection with the thickness of the forming portion 53 (foamed region) of the preform 50 or the total thickness of the unfoamed layers Y, the thickness of the container wall (specifically, the thickness of the body wall 63) can be selected to be not less than 0.3 mm in the case of a medium to large container having a high stretching ratio and not less than 2 mm in the case of a small container that is not stretched too much. It is, further, desired that the total thickness of the unfoamed layers Z is in a range of 20 to 70% and, specifically, 30 to 60% of the thickness of the container wall. Upon adjusting the thicknesses of the unfoamed layers Z as described above, it is allowed to utilize the advantages of foaming to a maximum degree, such as improving light-blocking capability, reducing weight and recycling the materials while effectively avoiding disadvantage caused by foaming.

The thicknesses of the unfoamed layers Z can be easily adjusted by adjusting the thicknesses of the unfoamed layers Y in the forming portion 53 of the preform 50 that is subjected to the stretching by taking the stretching conditions such as stretching ratio and the like into consideration.

In the foamed and stretched container 60 forming the body wall 63 of the foamed structure of the above normally distributed type, the degree of overlapping of the flatly foamed cells B is adjusted by utilizing the foamed state (size and density of the foamed cells $A^1$ in the central portion) in the forming portion 53 of the preform 50 such that the total light transmission factor is not more than 70% and, specifically, not more than 50% for the visible light ray of a wavelength of, for example, 500 nm. Namely, a high degree of light-blocking capability can be imparted offering great advantage from the standpoint of containing contents that are subject to be degenerated by light.

The unfoamed layers Z are present in the surfaces of the foamed region (body wall 63) where the foamed cells B are distributed effectively preventing the occurrence of swirl marks caused by the breakage of foams during the forming. Besides, the surfaces are very smooth exhibiting lustrous and excellent appearance and, therefore, offering a high commercial value.

2. Body Wall 63 of the Foamed Structure of the Locally Distributed Type:

By using the preform 50 having the forming portion 53 which has the foamed structure of the locally distributed type of FIG. 4 (b1), there is formed, in the body wall 63, the foamed structure in which the foamed cells B of the flat shape are locally distributed on the inner surface side as shown in FIG. 6. That is, the flatly foamed cells B drawn by the stretching are forming the foamed layer $X^2$ being locally distributed on the inner surface side corresponding to the distribution of FIG. 4 (b1).

Corresponding to the preform 50, further, the unfoamed layer Z where no foamed cell B is present is formed on the outer surface side of the container.

The stretch-forming, i.e., flattening of the foamed cells helps increase the degree of overlapping of the foamed cells A and greatly increase the light-blocking capability. With the foamed structure of the locally distributed type, further, the number of the foamed cells A is greatly increasing due to heating the preform 50 from the inner surface side thereof. Therefore, the light-blocking capability is, further, improved contributing to very increasing the degree of whiteness in the body wall 63 (inclusive of the bottom portion 65) that is forming the foamed region.

In FIG. 4(b1), further, the foamed cells $A^1$ present in the central portion O have the largest diameter and, besides, the foamed cells A present in the surface layer portion on the inner surface side, too, have a large diameter of nearly the same degree. The foamed cells A present between the central portion O and the inner surface have diameters of an intermediate size, the diameters of the foamed cells A decreasing from the central portion O toward the outer surface side. The foamed structure of the locally distributed type of FIG. 6 has a distribution of lengths of the flatly foamed cells B flattened by stretching, that meets the above distribution of diameters of the foamed cells A. Namely, as shown in FIG. 6, the foamed cells $B^1$ present in the central portion O has the largest length (length in the direction of maximum stretch) Lm, the flatly formed cells B present in the inner surface, too, have a similarly large length L, and the flatly formed cells B present between the center O and the inner surface as well as the flatly formed cells B positioned on the outer surface side have relatively short lengths.

In the container 60 of the invention forming the body wall 63 of the foamed structure of the above locally distributed type, the flatly foamed cells B of different lengths are distributed in many number on the inner surface side and, besides, the unfoamed layer Z containing no flatly foamed cell B is formed on the outer surface side. It is, therefore, allowed to improve the light-blocking capability while maintaining surface smoothness, appearance and printability. For instance, the light transmission factor for the visible ray (total light transmission factor at a wavelength of 500 nm) of not more than 20% can be attained. It is, further, allowed to effectively avoid a decrease in the strength or in the gas-barrier property caused by foaming, yet offering advantage from the standpoint of reducing the weight owing to foaming.

To form the foamed structure of the locally distributed type in the body wall 63, further, the temperature profile must be established in the forming portion 53 of the preform 50. It is, therefore, desired that the preform 50 introduced into the step of stretching has a thickness in the forming portion of not less than 2.5 mm. In the case of medium to large containers having high stretching ratios, therefore, the body wall 63 of the foamed and stretched container will have a thickness of not less than 0.3 mm and small containers that do not have to be so stretched will have a thickness in the container wall of not less than 2 mm.

In the containers having large thicknesses as described above, it is desired that the thicknesses of the unfoamed layers Z are in a range of 10 to 35% and, specifically, 15 to 25% of the thickness of the body wall 63 of the containers. Upon adjusting the thicknesses of the unfoamed layers Z, it is allowed to utilize advantages of foaming to a maximum degree, such as improving the light-blocking capability, reducing the weight, recycling the materials and the like while effectively avoiding disadvantage due to foaming. If the unfoamed layers Z have small thicknesses, the flatly foamed cells B assume a state of being distributed over the whole container wall resulting in the deterioration of strength, gas-barrier property and appearance.

Further, the body wall 63 having the foamed structure of the locally distributed type shown in FIG. 7 is obtained by stretch-forming the preform 50 that has the forming portion 53 in which the foamed structure of the locally distributed type of FIG. 4(b2) has been formed. Namely, in FIG. 7, a region P corresponding to the finely foamed layer Q on the inner surface side of FIG. 4(b2) is formed in the surface layer portion on the inner side, and foamed cells $B^2$ of very small lengths are highly densely formed therein. The foamed and stretched container having the above region P formed in the foamed region exhibits further improved light-blocking capability, e.g., a light transmission factor for visible rays of not higher than 20% and, specifically, not higher than 15%.

3. Body Wall 63 of the Very Finely Foamed Structure:

The foamed structure shown in FIG. 8 is obtained by stretch-forming the forming portion 53 of FIG. 4(c1), and in which, being corresponded to the forming portion 53, very finely foamed layers 30 are formed in the surface layer portion on the inner surface side and in the surface layer portion on the outer surface side, a foamed core layer $X^3$ is formed in the central portion O containing flatly foamed cells $B^1$, and unfoamed layers Z are formed among the foamed core layer $X^3$ and the very finely foamed layers 30.

Further, the foamed structure shown in FIG. 9 is obtained by stretch-forming the forming portion 53 of FIG. 4(c2), and in which, being corresponded to the forming portion 53, very finely foamed layer 30 is formed in the surface layer portion on the outer surface side only, a region P corresponding to the finely foamed layer 25 is formed on the inner surface side like that of the locally distributed type of FIG. 7, and unfoamed layers Z are formed between the very finely foamed layer 30 and the foamed core layer $X^3$.

Namely, the very finely foamed layers 30 formed in compliance with the very finely foamed layers 20 of FIGS. 4(c1) and 4(c2) contain, at a high density, the flatly foamed cells $B^3$ having very small lengths L (e.g., not more than 50 µm) in the direction of maximum stretch, effectively suppressing a decrease in the appearance, gas-barrier property and printability caused by foaming, yet improving light-blocking capability.

For instance, the body wall 63 having the foamed structure shown in FIG. 8 exhibits further improved light-blocking capability as compared to the foamed structure of the normally distributed type shown in FIG. 5, and the body wall 63 having the foamed structure shown in FIG. 9 exhibits further improved light-blocking capability as compared to the foamed structure of the locally distributed type shown in FIG. 7, i.e., exhibits a light transmission factor for visible rays, that is further decreased to be not higher than 10%.

In FIGS. 8 and 9, further, the unfoamed layers Z among the very finely foamed layers 30 and the foamed core layer $X^3$ are for preventing the merging of the flatly foamed very fine cells $B^3$ with the flatly foamed large cells B forming the foamed core layer $X^3$. The unfoamed layers Z may be as thin as possible so far as the very finely foamed layers 30 and the foamed core layer $X^3$ can be clearly distinguished from each other.

The foamed and stretched containers of the invention forming the above-mentioned various kinds of foamed structures in the body walls 63 are produced by the hot-parison method. Despite of using the hot-parison method, however, the mouth portion 61 is reliably prevented from foaming offering, therefore, a very high degree of practicability which is the greatest advantage of the present invention.

Moreover, the foamed and stretched containers of the invention are produced by the hot-parison method which effectively utilizes the heat and which, therefore, can be effectively applied to producing containers having large thicknesses. The cold-parison method requires a large amount of heat energy for stretching thick preforms. According to the present invention, however, the preform that is formed is foamed and stretched in a state of maintaining a temperature at which it can be stretched; i.e., there is no need of heating the preform.

The above containers are very utilizable in the field where high degree of appearance is required, such as containing cosmetics in addition to being used for containing seasonings and detergents such as shampoo and the like. They can also be used in the field of beverages and the like, as a matter of course.

EXAMPLES

The invention will now be described by way of Examples.

In the following Examples, the foamed and stretch-formed containers were produced according to the process shown in FIG. 1. The injection-molding machine was a so-called foaming injection machine capable of dosing a foaming gas on the way of a heating barrel to effect the mixing.

The metal mold was the one having a structure as schematically shown in FIG. 2. The metal mold can be cooled down to temperatures that are different depending on the mouth portion and the body wall (forming portion). Namely, the mouth portion is cooled by controlling the temperature of the cooling water that flows into the metal mold of a portion designated at 3(a) in FIG. 2, and the body wall can be cooled by controlling the temperature of the cooling water that flows into the metal mold of portions designated at 3(b) and 5 in FIG. 2 and that, further, flows into the metal mold forming the bottom portion.

As the resin for forming containers, use was made of a commercially available PET resin (intrinsic viscosity: 0.84 dl/g) for bottles, that was dried to a sufficient degree by using a dehumidifier/drier.

In the following Examples, the PET resin was fed to a hopper of the injection-molding machine, a nitrogen gas was dosed as the foaming agent on the way of the heating barrel of the injection-molding machine and was mixed together with the PET resin so as to be dissolved therein, and the molten PET in which the gas was dissolved injection-molded into a preform of the shape of a test tube (weight; 25 g, thickness of the body wall in mold cavity: 3 to 3.5 mm). In conducting the injection-molding, the air of a high pressure was dosed into the metal mold prior to starting the injection to suppress the foaming at the time of filling.

As the conditions for the injection-molding, the pressure at the time of filling was adjusted, the time for cooling the interior of the metal mold was adjusted, and the temperature of the preform was controlled at the time of when it was taken out to control the foaming. Here, the time for holding the pressure at the time of filling can be defined to be the total time of the filling time and the holding pressure time.

The preform taken out from the injection-molding metal mold was passed through the step of annealing for about 10 seconds to about 30 seconds to adjust the temperature of the preform and was, thereafter, stretch-blow molded into a 500-ml bottle. The stretching ratios in the longitudinal and transverse directions were about 3 times, respectively.

The following methods were based upon for making evaluations described in Examples and Comparative Examples.

(1) Stretch-Blow Adaptability:

The preform taken out from the injection-molding metal mold was measured for its temperatures on the surfaces thereof by using a thermometer of the contact type. Peak temperatures for a period of 10 to 30 seconds after taken out were evaluated as preform temperatures. If the temperatures were 85° C. to 120° C. on the inner and outer surfaces of the body wall, the stretch-blow adaptability was evaluated to be good. If the temperatures were lower than 85° C. or not lower than 120° C., the stretch-blow adaptability was evaluated to be poor.

(2) Foaming in the Mouth Portion:

The preform taken out from the injection-molding metal mold was cooled with the air for 10 to 30 seconds followed by the cooling with water to terminate the foaming. Thereafter, the foaming in the mouth portion and in the body wall was confirmed by observing the cross section thereof with the eye or by using an electron microscope. The evaluation was on the following basis.

⊚ (Best): No foamed cell was found at all in the mouth portion.

◯ (Good): Foamed cell was not found in the threaded portion of the mouth portion but was found to a slight degree in the thick support ring portion.

x (Poor): Foamed cells were found in the whole mouth portion.

(3) Foamed Structure in the Body Wall:

The preform of (2) above or the bottle that was stretch-blow-molded was observed for the formation of foamed cells in the body wall in cross section by using the electron microscope. Further, the foamed layers and the unfoamed layers were evaluated for their thicknesses.

(4) Evaluating the Light-Blocking Capability:

The obtained bottle was cut near the central portion of the body wall and was measured for its total light transmission factor at a wavelength of 500 nm by using a spectrophotometer (UV-3100PC manufactured by Shimazu Mfg. Co.) based on the integration sphere measuring method.

Evaluating the Stretched and Foamed Bottle of a Foamed Structure of the Normally Distributed Type Example 1

A PET resin was thrown into a hopper of a foam-injection machine, heated and melted, a foaming agent of nitrogen was fed in an amount of 0.13 wt % per the amount of the resin on the way of the heating barrel, and a container preform was formed by the injection-molding. Here, prior to starting the injection, the interior of the metal mold was filled with the air of a high pressure of 5 MPa (counter pressure), and the pressure was released nearly simultaneously with the completion of the injection.

The temperatures of the cooling water flowing into the metal mold were so controlled that the mouth portion was maintained at 20° C. and the body wall at 60° C. The filling and holding pressure was 50 MPa, maintained for 11 seconds (in which the filling time was 2.2 seconds) and, after the pressure has been maintained, the cooling time in the metal mold was 0.5 seconds. The conditions for forming the preform were as shown in Table 1.

After the injection-molding, the state where the foaming was taking place in the body wall could be observed immediately after the preform was taken out from the metal mold. The preform was maintained at room temperature for 20 seconds, and the temperatures were measured on the surfaces of the preform. Thereafter, the preform was cooled with water to terminate the foaming, and was observed on the sectional surface. When the bottle was to be formed, the preform was similarly taken out from the metal mold, maintained at room temperature for 20 seconds, and was immediately formed into a container of the shape of a bottle by using the stretch-blow-molding machine.

Figure 10:
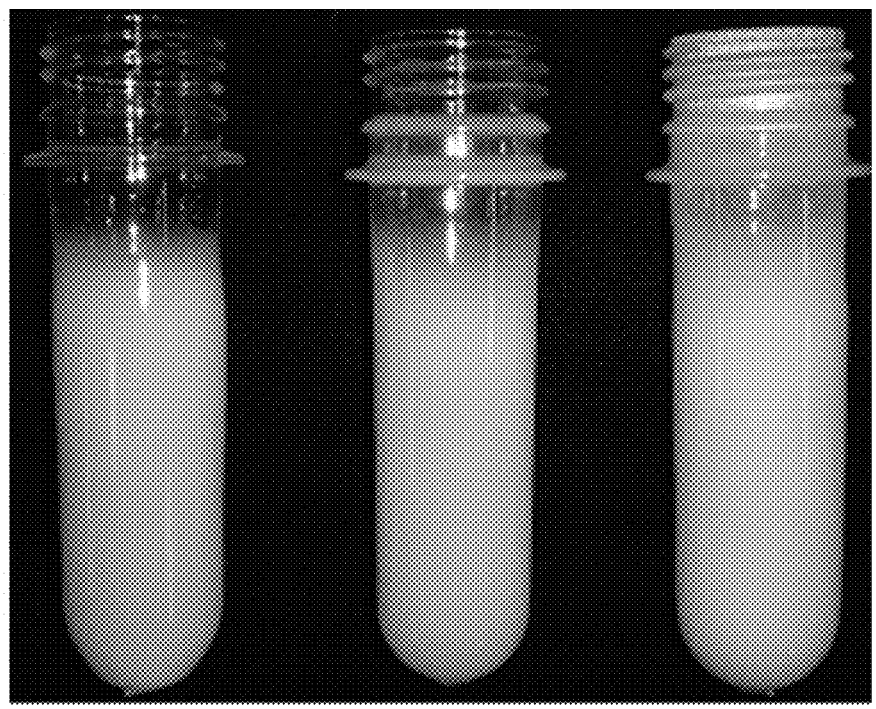
FIG. 10 is a photograph showing the appearance of preforms prepared in Examples 1, 2 and Comparative Example 1.

Table 2 shows the evaluated results of the preform and FIG. 10 shows the appearance thereof. The temperatures in the body wall of the preform were in a range of 85° C. to 120° C., and the blow adaptability was good.

As is obvious from FIG. 10-A) which is a photograph of appearance, further, quite no foamed cell was seen in the mouth portion whereas the foamed cells were formed in the body wall. The foamed structure was such that the unfoamed layers of 1.07 mm and 1.0 mm were formed in the outer surface and in the inner surface, respectively, and a foamed layer of 1.44 mm was formed in the central portion between them. Moreover, the foamed layer contained in the central portion thereof bubbles of sizes of about 200 μm, whereas small bubbles of about 100 μm were contained in the boundaries to the unfoamed layers in the inner and outer surfaces.

Figure 11:
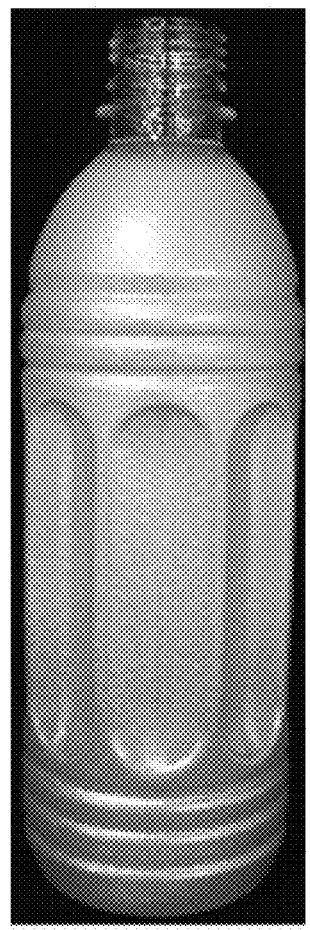
FIG. 11 is a photograph showing the appearance of a foamed container (bottle) prepared in Example 1.

FIG. 11 is a photograph of a bottle obtained by stretch-blow-molding, from which it is obvious that the foams were not quite formed in the mouth portion but were formed in the body wall and in the bottom portion.

The foamed structure of the body wall was such that the foamed structure of the preform was stretched in the direction of stretch; i.e., unfoamed layers were thickly formed in the inner and outer surfaces, and bubbles were formed in the foamed layer becoming longer in the direction of stretch as they approached the central portion. The surface exhibited smooth and lustrous appearance due to the unfoamed layer thickly formed in the outer surface.

Example 2

A preform and a bottle were formed in the same manner as in Example 1 but setting the temperature at the end of the extruder to be 290° C. which was 15° C. lower than that of Example 1, so controlling the temperatures of the cooling water flowing into the metal mold that the mouth portion was maintained at 10° C. and the body wall at 50° C., holding the pressure for 8 seconds at the time of filling, effecting the cooling in the metal mold for 0 second, and maintaining the room temperature for 10 seconds after the preform was taken out.

Table 2 shows the evaluated results of the preform and FIG. 10 shows the appearance thereof.

The temperatures in the body wall of the preform were in a range of 85° C. to 120° C., and the blow adaptability was good.

As is obvious from FIG. 10-B) which is a photograph of appearance, further, quite no foamed cell was seen in the threaded portion of the mouth portion whereas the foamed cells were formed in the body wall.

Figure 12:
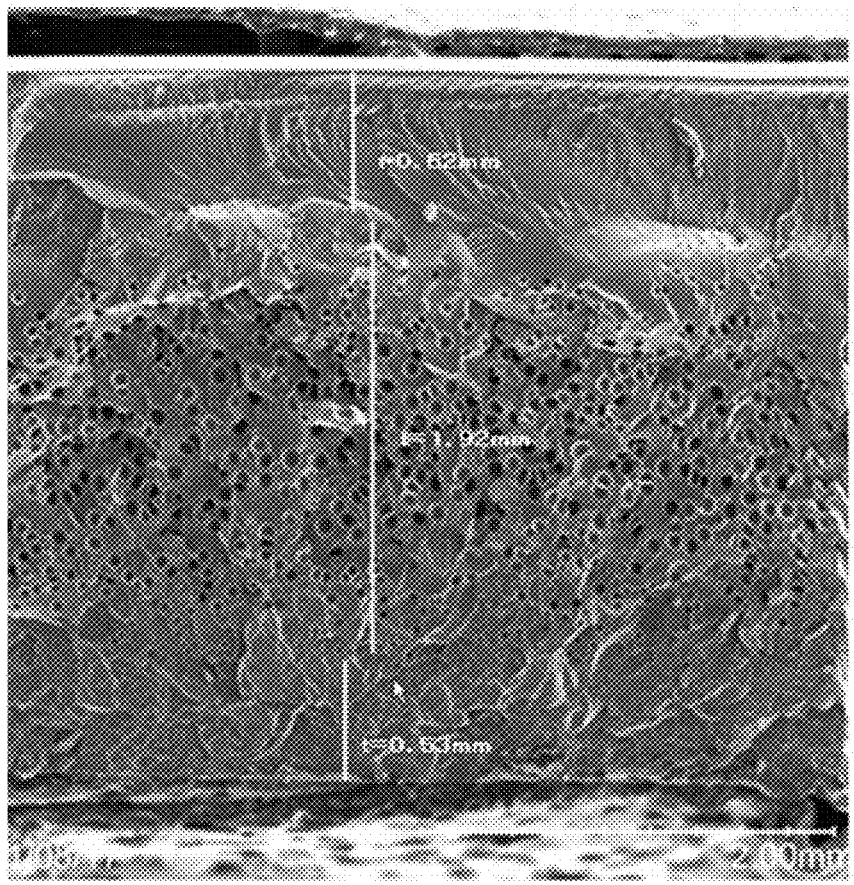
FIG. 12 is a microphotograph showing, in cross section, the body wall of the preform prepared in Example 2.

As shown in FIG. 12, further, the foamed structure in the body wall of the preform was such that the unfoamed layers were thickly formed in the inner and outer surfaces, the foamed cells were formed in the central portion, and the largest foamed cells were formed in the central portion. The foamed cells in the central portion and in the boundaries to the unfoamed layers possessed sizes of about 100 μm and about 30 μm, respectively.

After the stretch-blow-molding, the bottle was not foamed in the mouth portion but was foamed in the body wall and in the bottom portion. The foamed structure of the body wall was such that the unfoamed layers were thickly formed in the inner and outer surfaces, and bubbles were formed in the foamed layer becoming longer in the direction of stretch as they approached the central portion. The surface exhibited smooth and lustrous appearance due to the unfoamed layer thickly formed in the outer surface.

Example 3

A preform and a bottle were formed in the same manner as in Example 2 but holding the pressure for 6 seconds at the time of filling.

The stretch-blow adaptability was good, and there was obtained a preform that was not foamed in the mouth portion but was foamed in the body wall and in the bottom portion.

The foamed structure in the body wall of the preform was such that the unfoamed layers were thickly formed in the inner and outer surfaces, the foamed layer was formed in the central portion, and larger foamed cells were formed toward the central portion. The foamed cells in the central portion and in the boundaries to the unfoamed layers possessed sizes of about 250 μm and about 40 μm, respectively.

After the stretch-blow-molding, the bottle was not foamed in the mouth portion but was foamed in the body wall and in the bottom portion. The foamed structure of the body wall was such that the unfoamed layers were thickly formed in the inner and outer surfaces, and bubbles were formed in the foamed layer becoming longer in the direction of stretch as they approached the central portion. The surface exhibited smooth and lustrous appearance due to the unfoamed layer thickly formed in the outer surface.

Comparative Example 1

A preform was formed in the same manner as in Example 3 but holding a pressure of 20 MPa at the time of filling. The pressure of 20 MPa at the time of filling was in a standard range of pressure that was employed when the unfoamed preforms without containing foaming agent were to be formed, and was not a particularly low pressure.

Table 2 shows the evaluated results of the preform and FIG. 10 shows the appearance thereof.

The temperatures in the body wall of the preform were in a range of 85° C. to 120° C., and the blow adaptability was good. As is obvious from FIG. 10-C) which is a photograph of appearance, however, the preform as a whole inclusive of the mouth portion had been foamed. Though the foamed state was good in the body wall, the mouth portion had been foamed not only exhibiting poor appearance but also posing instability in the sealing and dimension.

Comparative Example 2

A preform was formed in the same manner as in Example 3 but so controlling the temperatures of the cooling water flowing into the metal mold that the mouth portion was maintained at 20° C. and the body wall at 25° C.

The preform was good without foaming in the mouth portion, but the foamed cells in the body wall were less than those of Example 1 to 3. Further, the temperatures on the inner and outer surfaces of the body wall were lower than 85° C., and the stretch adaptability was poor.

Comparative Example 3

A preform was formed in the same manner as in Example 3 but without pressurizing the interior of the metal mold with a high-pressure gas prior to starting the injection.

The preform developed so-called defective swirl marks on the surface of the mouth portion and contained foamed cells in the mouth portion. This was presumably due to that the foaming took place while the resin was injected into the metal mold, and the foaming could not be suppressed to a sufficient degree despite the pressure was subsequently applied.

Comparative Example 4

A preform was formed in the same manner as in Example 3 but holding the pressure for 4 seconds at the time of filling.

The preform was good concerning the stretch-blow adaptability and foamed state in the body wall, but developed bubbles in the mouth portion.

Comparative Example 5

A preform was formed in the same manner as in Example 3 but setting the metal mold temperature of the mouth portion at 50° C.

The preform was good concerning the stretch-blow adaptability and foamed state in the body wall, but developed bubbles in the mouth portion.

TABLE 1

| | Temp. of metal mold-cooling water, ° C. | | Filling and holding pressure | | Time for cooling the interior of mold, sec. | Counter pressure, MPa |
|---|---|---|---|---|---|---|
| | Mouth portion | Body wall | Pressure, MPa | Time, sec. | | |
| Ex. 1 | 20 | 60 | 50 | 11 | 0.5 | 5 |
| Ex. 2 | 10 | 50 | 50 | 8 | 0 | 5 |
| Ex. 3 | 10 | 50 | 50 | 6 | 0 | 5 |
| Comp. Ex. 1 | 10 | 50 | 20 | 6 | 0 | 5 |
| Comp. Ex. 2 | 20 | 25 | 50 | 6 | 0 | 5 |
| Comp. Ex. 3 | 10 | 50 | 50 | 6 | 0 | 0 |
| Comp. Ex. 4 | 10 | 50 | 50 | 4 | 0 | 5 |
| Comp. Ex. 5 | 50 | 50 | 50 | 6 | 0 | 5 |

TABLE 2

| | Preform temperature, ° C. | | | | Foaming in the mouth portion of preform | Foaming in the body wall of preform | | Thickness, mm | | |
|---|---|---|---|---|---|---|---|---|---|---|
| | *1 | *2 | *3 | *4 | | | | Outer unfoamed layer | Central foamed layer | Inner unfoamed layer |
| Ex. 1 | 55 | 103 | 107 | good | no | ◎ | yes | 1.07 | 1.44 | 1.00 |
| Ex. 2 | 57 | 85 | 91 | good | no | ○ | yes | 0.62 | 1.92 | 0.53 |
| Ex. 3 | 63 | 90 | 99 | good | no | ○ | yes | 0.64 | 2.42 | 0.56 |
| Comp. Ex. 1 | 62 | 98 | 102 | good | yes | X | yes | — | — | — |
| Comp. Ex. 2 | 50 | 76 | 80 | poor | no | ◎ | yes | — | — | — |
| Comp. Ex. 3 | — | — | — | — | yes | X | yes | — | — | — |
| Comp. Ex. 4 | 74 | 104 | 112 | good | yes | X | yes | — | — | — |
| Comp. Ex. 5 | 73 | 91 | 100 | good | yes | X | yes | — | — | — |

*1: Outer surface of mouth portion
*2: Outer surface of body wall
*3: Inner surface of body wall
*4: Stretch blow adaptability Evaluating the Stretched and Foamed Bottle of a Foamed Structure of the Locally Distributed Type

Example 4

The PET resin was thrown into the hopper of the foam-injection machine, heated and melted, the foaming agent of nitrogen was fed in an amount of 0.13 wt % per the amount of the resin on the way of the heating barrel, and a preform (31 g, overall length of 110 mm, maximum thickness of the body wall of about 4.2 mm) for a 500-ml bottle was formed. Here, prior to starting the injection, the interior of the metal mold was filled with the air of a high pressure of 5 MPa (so-called counter-pressure method), and the pressure was released nearly simultaneously with the completion of the injection.

The temperatures of the cooling water flowing into the metal mold were so controlled that the mouth portion was maintained at 15° C. and the body wall at 25° C. The pressure at the time of filling was 50 MPa, maintained for 20 seconds (in which the injection time was about 3 seconds) and, after the pressure has been held, the cooling time in the metal mold was 1 second.

After the injection-molding, the state where the foaming was taking place in the body wall of the preform could be observed immediately after the preform was taken out from the metal mold. The preform was maintained at room temperature for 10 seconds, and the peak temperatures were measured on the surfaces of the preform by using the thermometer of the contact type. Thereafter, the preform was cooled with water to terminate the foaming, and was observed on the sectional surface.

When the bottle was to be formed, the preform taken out from the injection-molding metal mold was readily transferred to the stretch-blow-molding machine and was re-heated. The re-heating was such that when the inner surface side was to be heated, an iron core heated at a high temperature was inserted in the preform to heat the inner surface of the body wall of the preform for 10 seconds. The outer surface was weakly heated by using an infrared heater in a manner that no foamed cell was formed in the outer layer and that the stretchable temperature could be maintained. The re-heating was followed by the stretch-blow-molding to form a container of the shape of a bottle.

The peak temperatures of the body wall of the preform after it was taken out from the metal mold were 88° C. on the outer surface and 100° C. on the inner surface, and at which the preform could be stretched.

Figure 13:
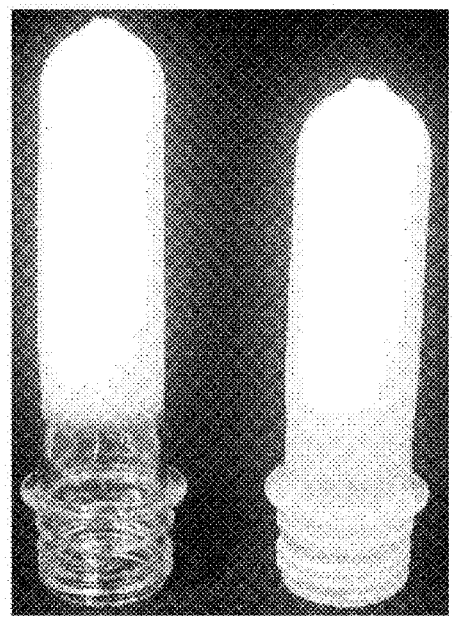
FIG. 13 is a photograph showing the appearance of preforms prepared in Example 4 and Comparative Example 6.

FIG. 13-a shows the appearance of the preform after it was re-heated. As is obvious from this photograph of appearance, no foamed cell was seen in the mouth portion and the foamed cells had been formed in the body wall.

Figure 14:
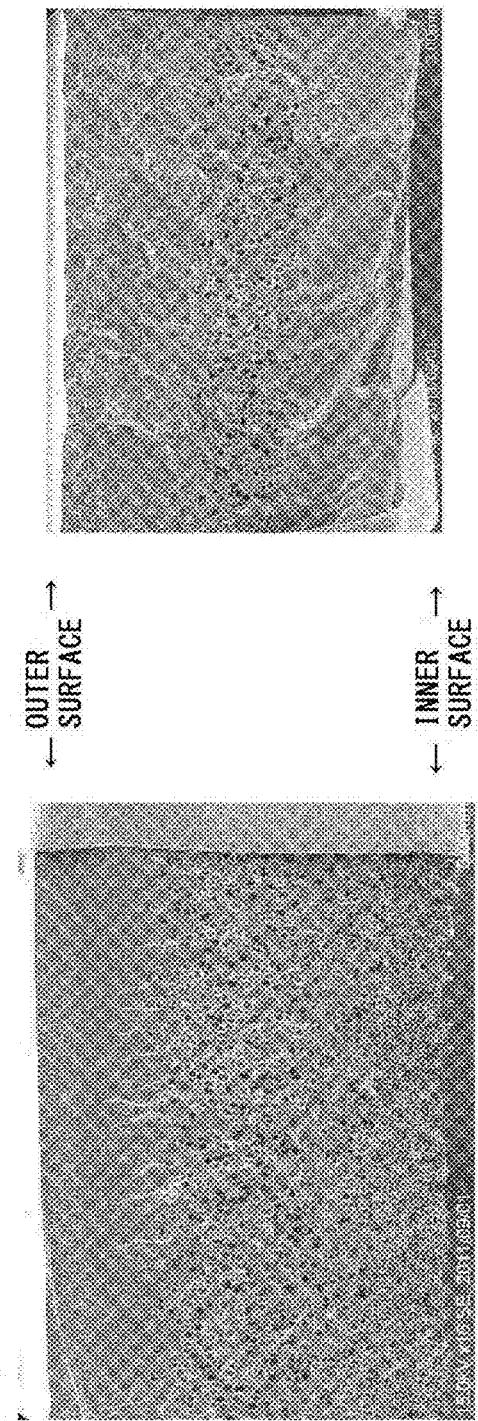
FIG. 14 is a microphotograph showing, in cross section, the forming portions of the preforms prepared in Examples 4 and 6.

FIG. 14-a is a photograph showing in cross section the foamed portion in the body wall.

The outer layer was the unfoamed layer which was about 25% of the thickness of the preform, and the foamed cells were formed in the central portion and in the inner layer. The average cell diameter of the foamed cells was 84 μm in the central portion (about 50% of the whole thickness) and their sizes were decreasing toward the outer surface and the inner surface. Further, the inner layer (about 25% of the whole thickness) contained the foamed cells of an average cell diameter of 45 μm. From the comparison with Comparative Example 6 appearing later, it was considered that the foamed cells in the inner layer side were foamed as a result of re-heating the inner surface side after the injection-molding.

FIG. 15-a is a photograph of a bottle after it was stretch-blow-molded.

As is obvious from this photograph, the container had not been foamed at all in the mouth portion but had been foamed in the body wall and in the bottom portion.

The foamed structure in the body wall, as shown in FIG. 15-b, was like that of stretching the foamed structure of the preform in the direction of stretch. Namely, the outer layer was the unfoamed layer which was about 25% of the whole thickness, and the flatly foamed cells stretched in the direction of stretch were formed in the central portion and in the inner layer. The foamed cells were large in the central portion, and the foamed cells on the inner layer side were smaller than those in the central portion.

The surface of the obtained bottle exhibited smooth and lustrous appearance due to the unfoamed layer thickly formed in the outer surface. The total light transmission factor of the body wall was 11.3%, which was a high light-blocking capability.

Example 5

A preform and a bottle were formed in the same manner as in Example 1 but by increasing the iron core temperature for heating the inner surface to be higher than that in Example 1 and changing the heating time to 5 seconds in re-heating the preform of Example 4.

The preform after re-heated had not been foamed in the mouth portion but had been foamed in the body wall like in Example 4. In the body wall, the outer layer was a thick unfoamed layer, and the central portion contained large foamed cells which were becoming smaller toward the inner and outer surfaces roughly like in Example 4. However, the foamed structure in the inner layer was different from that of Example 4. Namely, as shown in FIG. 4 (c2), relatively large foamed cells were formed near the inner surface in contrast with Example 4, and smaller foamed cells were formed in the intermediate portion between the central portion and the inner surface.

The above formed structure stemmed probably from that the foamed cells large in size grew in the inner surface due to a higher iron core temperature for heating the inner surface than that in Example 4 and that the foamed cells did not so much grow in the intermediate portion between the central portion and the inner surface since the temperature therein was not so high due to short re-heating time.

The foamed structure in the bottle was like that of stretching the foamed structure of the preform in the direction of stretch. Further, the total light transmission factor of the body wall was 17%, which was a high light-blocking capability.

Example 6

A bottle was formed in the same manner as in Example 4 but without re-heating the preform after it was injection-molded.

The preform was not foamed in the mouth portion and was maintained at a temperature suited for effecting the stretch-forming. Further, as is obvious from FIG. 14-b which is a photograph of a cross section of the body wall of the preform, the outer layer was a thick unfoamed layer, foamed cells of large sizes were formed in the central portion, and the foamed cells were becoming smaller toward the inner and outer surfaces like in Example 4. Here, however, no foamed cell was seen in the inner layer which, therefore, was a thick unfoamed layer like the outer layer.

The total light transmission factor in the body wall of the bottle was 28%, and was inferior to the light-blocking capability of Example 4.

Comparative Example 6

A preform for 500 ml was formed by using the same injection-molding machine as the one used in Example 4 and changing the preform-forming metal mold into the one for 25 g (overall length of about 100 mm, maximum thickness of body wall of about 3.2 mm). The preform was formed by so controlling the temperatures of the cooling water flowing into the metal mold that the mouth portion was maintained at 10° C. and the body wall at 50° C. The pressure at the time of filling was 20 MPa, was held for 6 seconds, and the cooling time in the metal mold was 0 second. The pressure of 20 MPa at the time of filling was in a standard range of when the unfoamed preform without containing foaming agent was to be formed, and was not a particularly low pressure.

After taken out from the metal mold, the preform was immediately transferred to the stretch-forming machine to form a bottle.

FIG. 13-b is a photograph showing the appearance of the preform that was taken out just before being stretch-formed and is in a state of being cooled with water to discontinue the foaming. As will be learned from the photograph, the foamed cells were formed not only in the body wall of the preform but also in the mouth portion thereof. The obtained bottle, too, had been formed in the mouth portion as a matter of course, not only exhibiting poor appearance of the mouth portion but also posing instability in the sealing and dimension.

Evaluating the Stretched and Foamed Bottle of the Very Finely Foamed Structure

Example 7

The PET resin was thrown into the hopper of the foam-injection-molding machine, heated and melted, the foaming agent of nitrogen was fed in an amount of 0.13 wt % per the amount of the resin on the way of the heating barrel, and a preform (31 g, overall length of 110 mm, maximum metal mold thickness of the body wall of about 4.2 mm) for a 500-ml bottle was formed. Here, prior to starting the injection, the interior of the metal mold was filled with the air of a high pressure of 5 MPa (so-called counter-pressure method), and the pressure was released nearly simultaneously with the completion of the injection.

The conditions for the injection-molding were set as described below so that the mouth portion of the preform was not foamed by taking the sealing with the cap into consideration and that a number of foamed cells were formed in the body wall by taking the light-blocking capability into consideration. Namely, the temperatures of the cooling water flowing into the metal mold were so controlled that the mouth portion was maintained at 15° C. and the body wall at 25° C. The pressure at the time of filling was 50 MPa, was held for 20 seconds (in which the filling time was about 3 seconds) and, after the pressure has been held, the cooling time in the metal mold was 0 second.

After the injection-molding, the preform was taken out from the metal mold and was immediately transferred into the stretch-blow-molding machine to re-heat the body wall and the bottom portion. The re-heating was such that when the inner surface side was to be heated, the iron core heated at a high temperature was inserted in the preform to heat the inner surface of the body wall and of the bottom portion of the preform for 10 seconds. The outer surface was weakly heated by using the infrared heater in a manner that the foamed cells did not grow excessively on the outer layer side and that the stretchable temperature could be maintained. The re-heating was followed by the stretch-blow-molding to form a container of the shape of a bottle.

FIG. 17 is a sectional view of the foamed body wall of the preform just before it is stretch-blow-molded but after it is cooled with water to discontinue the foaming as observed by using an electron microscope.

As will be learned from the figure, the preform is constituted by four layers of a very finely foamed layer, an unfoamed layer, a foamed layer in the central portion and a finely foamed layer from the outer surface toward the inner surface of the preform.

The very finely foamed layer which is the outer surface has a thickness of 0.57 mm (10% of the whole thickness) and is constituted by very fine and highly densely foamed cells having an average cell diameter of 6.6 μm and a cell density of $6 \times 10^7$ cells/cm$^3$.

The unfoamed layer has a thickness of 0.61 mm (11% of the whole thickness).

The foamed layer in the central portion (foamed core layer) has a thickness of 3.0 mm (55% of the whole thickness) and contains the foamed cells of the greatest sizes in the central portion thereof in the direction of thickness, the sizes of the foamed cells decreasing toward the inner and outer surfaces.

The finely foamed layer has a thickness of 1.4 mm (24% of the whole thickness) and contains the foamed cells of sizes smaller than those in the foamed layer in the central portion but larger than those in the very finely foamed layer.

In Example 7, further, the preform taken out from the metal mold was held in its state for 10 seconds without being re-heated and was, thereafter, cooled with water to discontinue the foaming. From the observation of the cross section thereof, it was confirmed that the very finely foamed layer had been formed on the outer surface side and the unfoamed layer had been formed in the inside thereof like the case of when the preform was re-heated. The very finely foamed layer was forming the foamed cells of sizes smaller than those of when the preform was re-heated.

Figure 16:
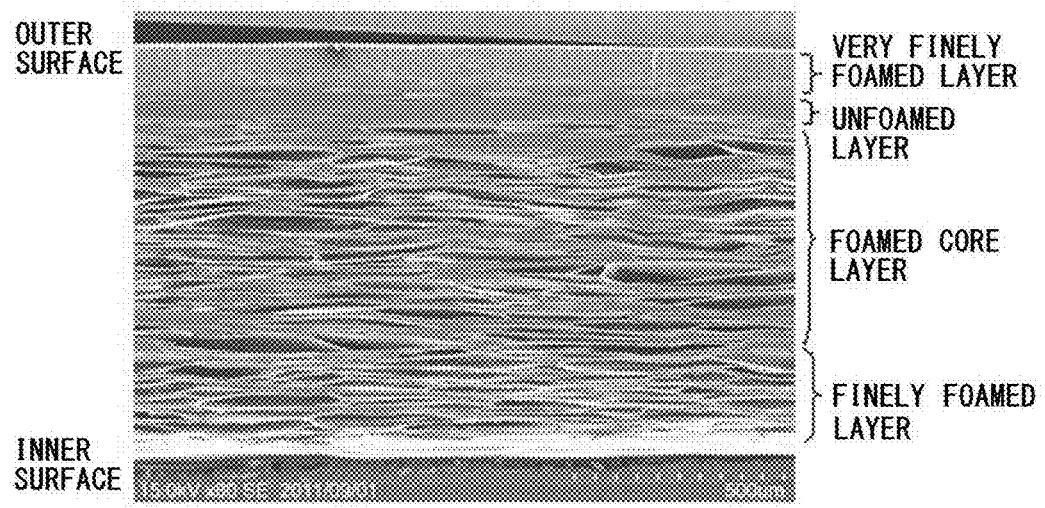
FIG. 16 is a microphotograph showing, in cross section, the body wall of a foamed container (bottle) prepared in Example 7.
Figure 18:
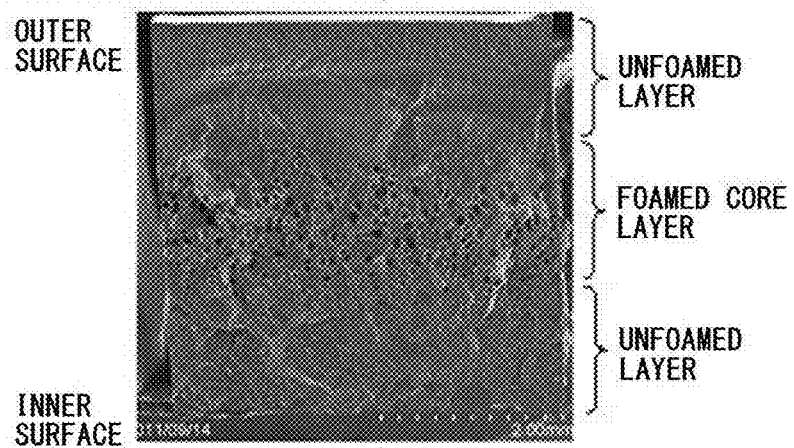
FIG. 18 is a microphotograph showing, in cross section, the forming portion of a preform prepared in Example 8.

FIG. 16 is a photograph showing in cross section the body wall of the bottle of Example 7. As is obvious from the photograph, the foamed structure (FIG. 17) of before being stretch-blow-molded is stretched in the direction of stretch, and the preform is constituted by four layers of the very finely foamed layer, unfoamed layer, foamed layer in the central portion (foamed core layer) and finely foamed layer from the outer surface toward the inner surface.

The foamed and stretched bottle that was obtained had a smooth outer surface presenting very fine and excellent appearance from which the presence of foamed cells could not be quite discerned with the eye.

Further, the central portion of the body wall of the bottle was cut out and was measured for its total light transmission factor at a wavelength of 500 nm to be 8.8%, i.e., excellent light-blocking capability.

Example 8

A preform and a foamed and stretched bottle were formed in the same manner as in Example 7 but so controlling the temperatures of the cooling water flowing into the metal mold during the injection-molding that the mouth portion was maintained at 15° C. and the body wall at 20° C., setting the cooling time in the metal mold after the pressure has been held to be 3 seconds, and without re-heating the preform before the stretch-blow-molding.

The preform was taken out before it was stretch-blow-molded to make sure the structure of foaming in the same manner as in Example 7. No very finely foamed layer was seen in the outer layer as shown in FIG. 17, and the preform was constituted by three layers of the unfoamed layer, foamed layer in the central portion (foamed core layer) and unfoamed layer from the outer surface side.

The foamed and stretched bottle that was obtained had a smooth outer surface presenting relatively excellent appearance but from which the presence of foamed cells in the central portion could be slightly discerned with the eye through the unfoamed layer that was the outer surface. Namely, the bottle was inferior to that of Example 1 in regard to fineness of appearance. Further, the total light transmission factor was 26%, and the light-blocking capability was inferior to that of Example 7.

DESCRIPTION OF REFERENCE NUMERALS

1: injection metal mold
3: shell metal mold
   (3a: mouth portion metal mold, 3b: forming portion metal mold)
5: core metal mold
7: cavity
9: injection nozzle
10: gas port
20: very finely foamed layer
50: preform
53: forming portion
60: foamed and stretched container
63: body wall
A: spherically foamed cells
B: flatly foamed cells
X, $X^1$, $X^2$, $X^3$: foamed layers
Y, Z: unfoamed layers
30: very finely foamed layer

The invention claimed is:

1. A foamed and stretched plastic container having a mouth portion and a container wall continuous to said mouth portion and is stretch-formed, said container wall forming a foamed region where foamed cells are distributed, and said mouth portion being an unfoamed region where no foamed cell is present, wherein;
   the foamed cells present in said foamed region have a flat shape being stretched in a direction of stretch, and said foamed cells positioned in a central portion in a direction of thickness of the container wall have the largest lengths in a direction of maximum stretch.

2. The foamed and stretched plastic container according to claim 1, wherein the lengths of the foamed cells in the direction of maximum stretch positioned on an innermost surface side and on an outermost surface side relative to the central portion in the direction of thickness of the container wall, are smaller than the lengths of the foamed cells in the direction of maximum stretch positioned in the central portion.

3. The foamed and stretched plastic container according to claim 1, wherein in said foamed region, an unfoamed layer where no foamed cell is present is formed on an inner surface side and/or on an outer surface side relative to the central portion in the direction of thickness of the container wall.

4. The foamed and stretched plastic container according to claim 3, wherein in said foamed region, unfoamed layers are formed on the inner surface side and on the outer surface side relative to the central portion in the direction of thickness of the container wall, the unfoamed layer on the outer surface side being thicker than the unfoamed layer on the inner surface side.

5. The foamed and stretched plastic container according to claim 4, wherein in said foamed region, the thickness of the container wall is not less than 0.3 mm, and the total thickness of the unfoamed layers on the inner surface side and on the outer surface side is in a range of 20 to 70% of the thickness of said container wall.

6. The foamed and stretched plastic container according to claim 1, wherein said foamed cells are locally distributed on the inner surface side relative to the central portion in the direction of thickness of the container wall.

7. The foamed and stretched plastic container according to claim 6, wherein in said foamed region, the foamed cells are distributed from the central portion of the container wall up to the surface layer portion in the inner surface of the container wall, and the foamed cells which are the shortest in the direction of maximum stretch are distributed in the form of a layer in an intermediate portion between the central portion of the container wall and the surface layer portion in the inner surface of the container wall.

8. The foamed and stretched plastic container according to claim 6, wherein in said foamed region, the foamed cells are distributed from the central portion of the container wall up to the surface layer portion in the inner surface of the container wall, and the foamed cells which are the shortest in the direction of maximum stretch are distributed at the highest density in the form of a layer in the surface layer portion in the inner surface of the container wall.

9. The foamed and stretched plastic container according to claim 6, wherein in said foamed region, the thickness of the container wall is not less than 0.3 mm, and an unfoamed layer where no foamed cell is present is formed on the outer surface side of the container wall over a range of 10 to 35% of the thickness of said container wall.

10. The foamed and stretched plastic container according to claim 6, wherein said foamed region has a visible light transmission factor of not more than 20%.

11. The foamed and stretched plastic container according to claim 1, wherein in said foamed region, a very finely foamed layer is formed in the surface layer portion on the outer surface side of the container wall and/or in the surface layer portion on the inner surface side thereof, the very finely foamed layer containing, distributed therein, the foamed cells which are the shortest in the direction of maximum stretch, and an unfoamed layer where no foamed cell is distributed is formed between said very finely foamed layer and the foamed core layer that contains the foamed cells positioned in the central portion of the container wall.

12. A method of producing a foamed and stretched plastic container by forming a preform of a shape having a mouth portion and a forming portion continuous to the mouth portion by injection-molding a mold cavity with a molten polymer, transferring said preform taken out from the mold cavity to a step of stretch-forming, and stretch-forming the forming portion of said preform, wherein;
   said molten polymer is a melt in which an inert gas is dissolved;
   a metal mold forming said mold cavity is a metal mold of which a portion corresponding to said mouth portion has a cooling capability larger than that of a portion corresponding to said forming portion;
   said mold cavity is injection-filled with said molten polymer while applying a pressure thereto to hold a high pressure in said mold cavity so that foaming does not take place;
   said mouth portion is forcibly cooled by said metal mold so that the foaming does not take place even after the pressure is released;

said forming portion is weakly cooled by said metal mold so that the foaming takes place starting from a central portion of a container wall due to the temperature of resin after the pressure has been released; and the preform taken out from said metal mold is transferred to said step of stretching and is stretch-formed while the central portion of the container wall of said forming portion is still being maintained at a stretch-formable temperature;

wherein the resulting foamed and stretched plastic container having said mouth portion and said container wall continuous to the mouth portion and is stretch-formed, the container wall forming a foamed region where foamed cells are distributed, and that said mouth portion being an unfoamed region where no foamed cell is present, wherein;

the foamed cells present in the foamed region have a flat shape being stretched in a direction of stretch, and the foamed cells positioned in a central portion in a direction of thickness of the container wall have the largest lengths in a direction of maximum stretch.

13. The method of producing a foamed and stretched plastic container according to claim 12, wherein when said preform is taken out from said mold cavity after the pressure has been released, the central portion of the container wall of the forming portion is maintained at a foamable and stretchable temperature, and the foaming takes place starting from the central portion of said forming portion as said preform is taken out from said mold cavity.

14. The method of producing a foamed and stretched plastic container according to claim 12, wherein when said preform is taken out from said mold cavity after the pressure has been released, the outer surface and the inner surface of the forming portion of said preform have been cooled down to a temperature at which the foaming does not take place, and after said preform is taken out from said mold cavity, the foaming proceeds from said central portion toward the outer surface side and the inner surface side due to heat conducted from the central portion.

15. The method of producing a foamed and stretched plastic container according to claim 12, wherein at least after said preform is taken out from said mold cavity, the temperatures on the outer surface and the inner surface of the forming portion of said preform rise to the stretchable temperature due to heat conducted from the central portion.

16. The method of producing a foamed and stretched plastic container according to claim 12, wherein even after said preform is taken out from said mold cavity, the outer surface and the inner surface of the forming portion of said preform are maintained at temperatures at which no foaming takes place.

17. The method of producing a foamed and stretched plastic container according to claim 12, wherein said forming portion taken out from said metal mold is selectively heated from the inner surface side so that the foaming starts taking place from the central portion of the container wall as well as from the inner surface side of said forming portion.

18. The method of producing a foamed and stretched plastic container according to claim 12, wherein in the foamed preform introduced into the step of stretching, the foamed cells positioned on the innermost surface side and on the outermost surface side in the direction of thickness of the container wall have diameters smaller than the diameters of the foamed cells positioned in said central portion.

19. The method of producing a foamed and stretched plastic container according to claim 12, wherein in the foamed preform introduced into the step of stretching, said foamed cells are locally distributed between the central portion and the inner surface side in the direction of thickness of the container wall.

20. The method of producing a foamed and stretched plastic container according to claim 12, wherein in the foamed preform introduced into the step of stretching, the surface layer on the outer surface side and/or the inner surface side of the container wall of the forming portion is forming a very finely foamed layer in which very finely foamed cells having diameters of not more than 15 μm are distributed in the form of a layer at a density of not less than $1 \times 10^7$ cells/cm$^3$.

* * * * *